United States Patent
Saito et al.

(10) Patent No.: US 8,337,729 B2
(45) Date of Patent: Dec. 25, 2012

(54) OPTICAL DISC MANUFACTURING METHOD

(75) Inventors: Noriyuki Saito, Miyagi (JP); Hiroshi Uchiyama, Miyagi (JP); Takao Kudo, Miyagi (JP); Yusuke Suzuki, Miyagi (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 12/712,534

(22) Filed: Feb. 25, 2010

(65) Prior Publication Data

US 2010/0225028 A1 Sep. 9, 2010

(30) Foreign Application Priority Data

Mar. 9, 2009 (JP) ................................ 2009-055404

(51) Int. Cl.
*B29D 11/00* (2006.01)
(52) U.S. Cl. ...................... 264/1.33; 264/1.36; 264/1.38; 264/2.5; 425/810; 425/812
(58) Field of Classification Search .................... 264/1.1, 264/1.33, 1.38, 2.5, 1.36; 425/546, 569, 425/810, 812
See application file for complete search history.

(56) References Cited

U.S. PATENT DOCUMENTS 4,871,404 A * 10/1989 Murata et al. ................ 156/73.1

FOREIGN PATENT DOCUMENTS

| JP | 60-173735 | * | 9/1985 |
| JP | 6-168482 | * | 6/1994 |
| JP | 2008-071433 | | 3/2008 |
| JP | 2008-282525 | | 11/2008 |

* cited by examiner

*Primary Examiner* — Mathieu D. Vargot
(74) *Attorney, Agent, or Firm* — Wolf, Greenfield & Sacks, P.C.

(57) ABSTRACT

An optical disc manufacturing method includes: an injection step of injecting a liquid material into a circular plate-shaped injection space having a center hole portion at a center from an injection hole connected to an inner edge portion in the injection space; a discharge step of discharging air and the liquid material from a discharge hole formed on a straight line passing through the injection hole and a center of the center hole portion in a plane direction of the circular plate and at a position opposite to the injection hole; a curing step of curing the liquid material injected into the injection space; and a takeout step of taking out the cured liquid material from the injection space.

18 Claims, 15 Drawing Sheets

Structure (2) of recording layer molding machine according to first embodiment

Appearance of optical disc

Structure of optical disc

Structure of recording layer manufacturing apparatus

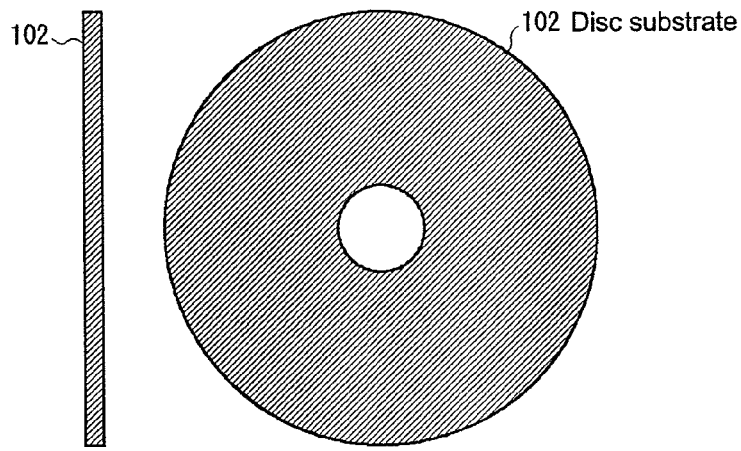
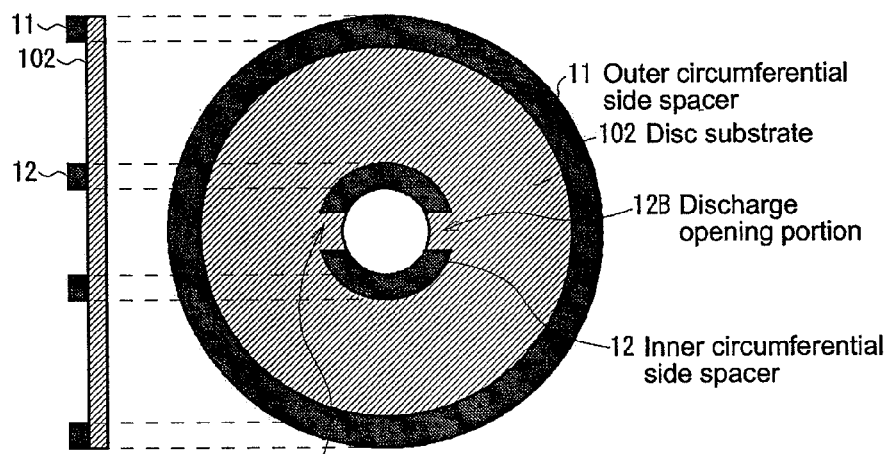
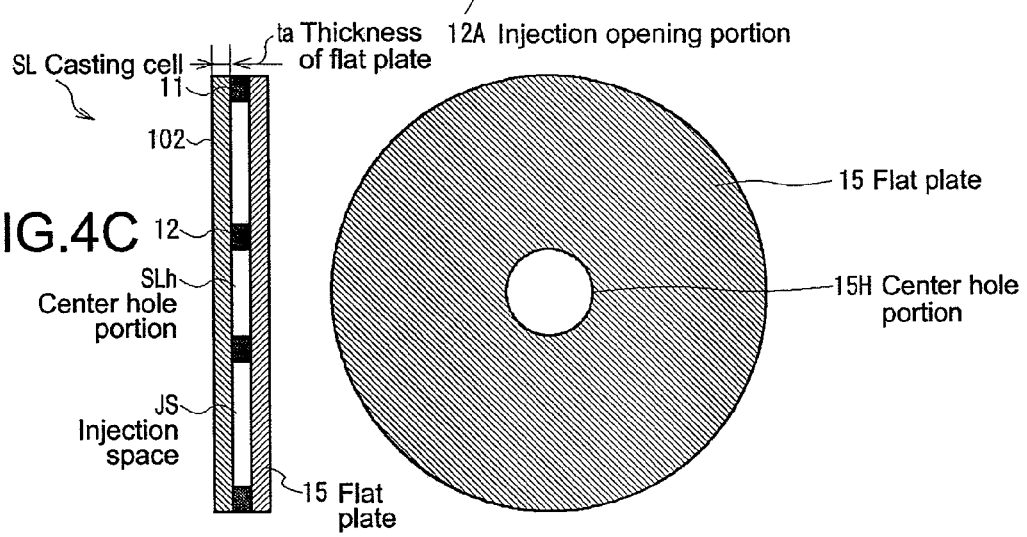
Structure (1) of recording layer molding machine according to first embodiment

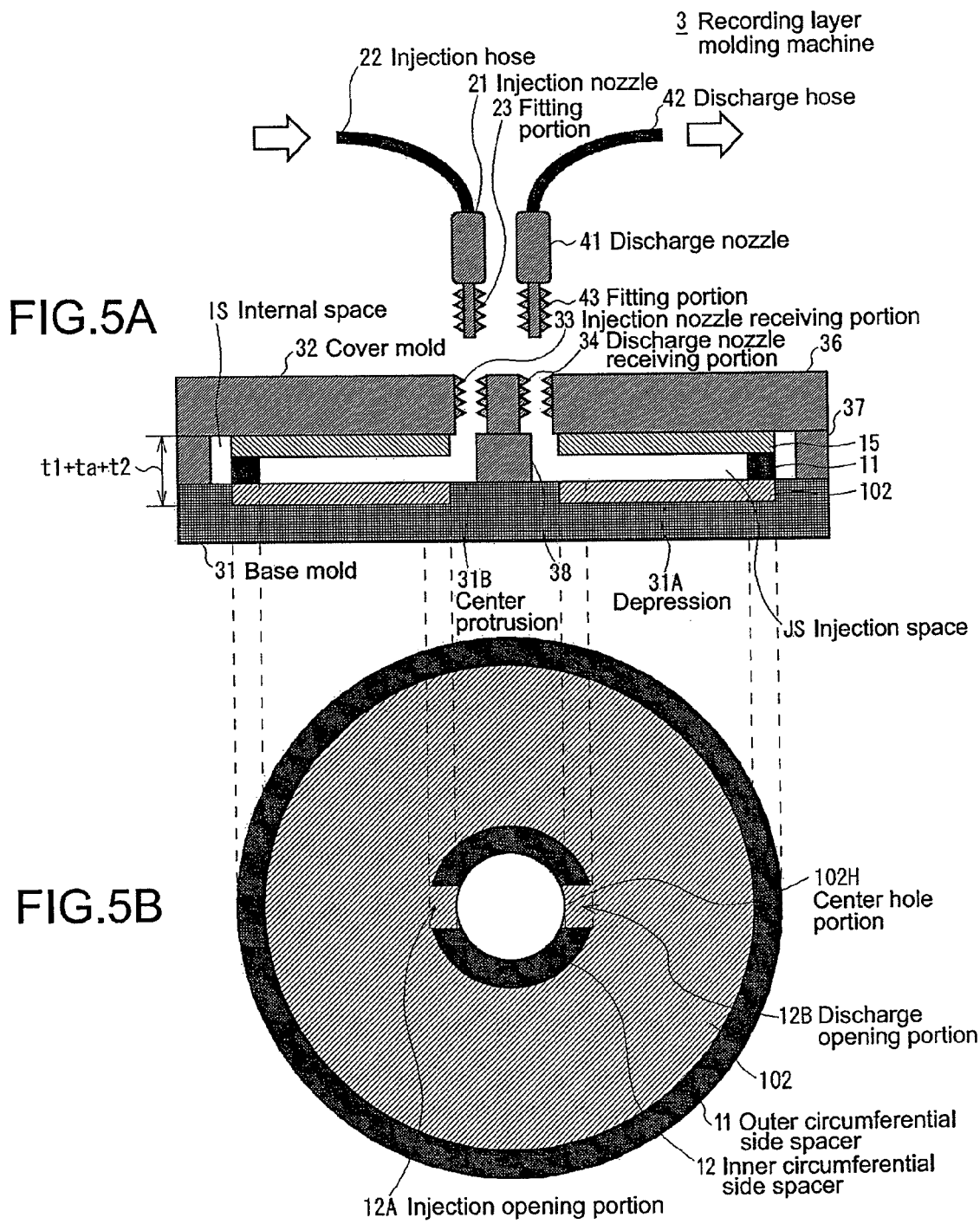
Structure (2) of recording layer molding machine according to first embodiment Structure of cover mold in first embodiment Position of opening portions Structure (1) of recording layer molding machine according to second embodiment

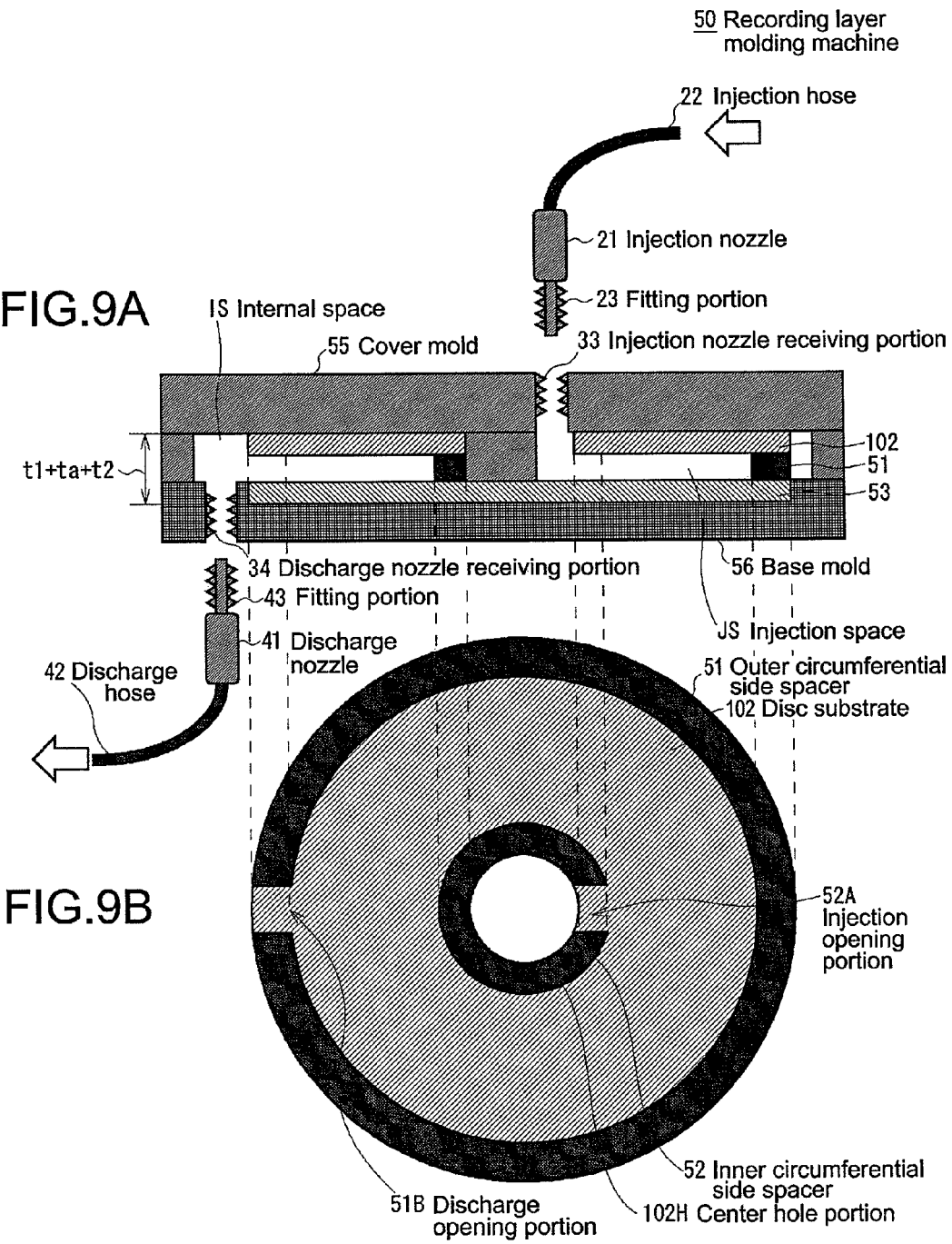
Structure (2) of recording layer molding machine according to second embodiment Structure of cover mold in second embodiment Structure (1) of recording layer molding machine according to third embodiment Structure of base mold in third embodiment Structure (1) of recording layer molding machine according to fourth embodiment Structure of base mold according to fourth embodiment Procedure of recording layer forming processing Structure (1) of recording layer molding machine according to other embodiment

OPTICAL DISC MANUFACTURING METHOD

BACKGROUND OF THE INVENTION

1. Field of the Invention

The present invention relates to an optical disc manufacturing method and an optical disc manufacturing apparatus that are suitably applied to a volumetric optical disc in which a plurality of mark layers are formed in a single recording layer, for example.

2. Description of the Related Art

From the past, circular plate-like optical discs are widely distributed and a CD (Compact Disc), a DVD (Digital Versatile Disc), a Blu-ray Disc (registered trademark, hereinafter referred to as BD), and the like are generally used.

In those optical discs, recording marks are two-dimensionally formed on a thin recording layer formed by sputtering or the like.

On the other hand, in an optical disc apparatus that supports the optical discs as described above, various contents such as music contents and video contents or various pieces of information such as various data items for a computer are recorded on the optical discs. Particularly in recent years, an amount of information has been increased due to achievement of high definition of videos, high sound quality of music, and the like and also needed to increase the number of contents to be recorded on one optical disc, and accordingly the optical disc is needed to achieve a larger capacity.

In this regard, there is proposed an optical disc in which a minute hologram formed by causing light beams of two systems to interfere with each other is set as a recording mark, and the plurality of recording marks are superimposed in a thickness direction of the optical disc, with the result that information whose amount corresponds to a plurality of recording layers is recorded on one recording layer and a large capacity is achieved in the optical disc (see, for example, Japanese Patent Application Laid-open No. 2008-71433, hereinafter referred to as Patent Document 1).

SUMMARY OF THE INVENTION

Incidentally, in the optical disc having the structure as described above, the plurality of recording marks are formed on one recording layer in the thickness direction. Therefore, the thickness of the recording layer is assumed to be equal to or larger than 0.05 mm and smaller than 1.0 mm, and a shape thereof is assumed to be a doughnut-shaped circular plate with a hole at the center thereof, like a shape of the optical disc.

There is known a method of casting a liquid material by spin coating and curing it in order to form a coating having a uniform thickness (see Japanese Patent Application Laid-open No. 2008-282525). However, the spin coating is a coating method appropriate for a thin film, and therefore may not be a method appropriate for forming a coating having a thickness equal to or larger than 0.05 mm because the viscosity of the liquid material is necessary to be adjusted, for example.

In view of the circumstances as described above, there is a need for an optical disc manufacturing method and an optical disc manufacturing apparatus capable of producing a doughnut-shaped circular plate having a uniform thickness.

According to an embodiment of the present invention, there is provided an optical disc manufacturing method including: an injection step of injecting a liquid material into a circular plate-shaped injection space that has a center hole portion at a center from an injection hole connected to an inner edge portion in the injection space; a discharge step of discharging air and the liquid material from a discharge hole formed on a straight line passing through the injection hole and a center of the center hole portion in a plane direction of the circular plate; a curing step of curing the liquid material injected into the injection space; and a takeout step of taking out the cured liquid material from the injection space.

Accordingly, in the optical disc manufacturing method, it is possible to push out air on an outer circumferential side while causing the liquid material to flow along the outer circumferential side, and uniformly fill the liquid material into the injection space.

Further, according to an embodiment of the present invention, there is provided an optical disc manufacturing apparatus including a space forming portion that forms a circular plate-shaped injection space having a center hole portion at a center and includes an injection hole that is provided for injection of a liquid material and connected to an inner edge portion in the injection space, and a discharge hole that is provided for discharge of air and formed on a straight line passing through the injection hole and a center of the center hole portion in a plane direction of the circular plate.

Accordingly, in the optical disc manufacturing apparatus, it is possible to push out air on an outer circumferential side while causing the liquid material to flow along the outer circumferential side, and uniformly fill the liquid material into the injection space.

Further, according to an embodiment of the present invention, there is provided an optical disc manufacturing method including: a formation step of forming a casting cell including an injection space having a thickness substantially the same as that of a recording layer on an adjacent layer that is adjacent to the recording layer on which a recording mark is formed in accordance with irradiation of light; a fill step of filling a liquid material in a liquid state into the casting cell; a curing step of curing the liquid material by applying energy to the liquid material and forming the recording layer; and a removal step of removing the casting cell.

Accordingly, in the optical disc manufacturing method, it is possible to directly form the recording layer having a uniform thickness on the adjacent layer.

According to the embodiments of the present invention, since the air on the outer circumferential side can be pushed out while causing the liquid material to flow along the outer circumferential side, the liquid material can be uniformly filled into the injection space, with the result that it is possible to realize an optical disc manufacturing method and an optical disc manufacturing apparatus capable of producing a doughnut-shaped circular plate having a uniform thickness.

Further, according to the embodiments of the present invention, the recording layer having a uniform thickness can be directly formed on the adjacent layer, with the result that it is possible to realize an optical disc manufacturing method capable of producing a doughnut-shaped circular plate having a uniform thickness.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 4A to 4C are simplified diagrams showing a structure (1) of a recording layer molding machine according to a first embodiment;

FIGS. 5A and 5B are simplified diagrams showing a structure (2) of the recording layer molding machine according to the first embodiment;

FIGS. 9A and 9B are simplified diagrams showing a structure (2) of the recording layer molding machine according to the second embodiment;

DESCRIPTION OF PREFERRED EMBODIMENTS

Hereinafter, embodiments of the present invention will be described in detail with reference to the drawings. It should be noted that descriptions will be given in the following order.

1. First embodiment (Optical disc manufacturing method)
2. Second embodiment (Discharge of liquid material from base mold)
3. Third embodiment (Injection of liquid material from cover mold)
4. Fourth embodiment (Removal of cover mold and curing of liquid material)
5. Other embodiment

1. First Embodiment

1-1. Structure of Optical Disc

First, a structure of an optical disc of a first embodiment will be described.

Figure 1:
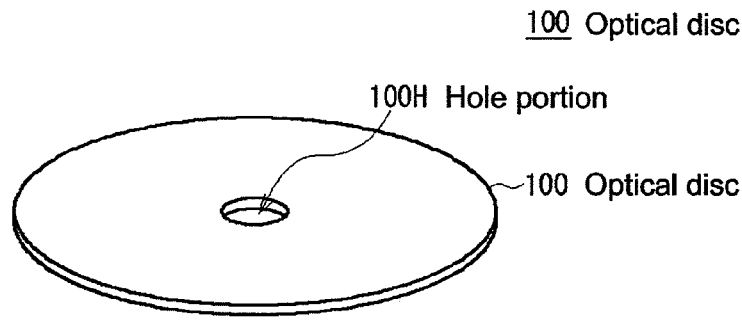
FIG. 1 is a simplified diagram showing an appearance of an optical disc.

An optical disc 100 serving as an optical information recording medium has a shape of a substantially circular plate as a whole as shown in FIG. 1 that is an appearance diagram, and is provided with a hole portion 100H for chucking at the center thereof. The optical disc 100 is formed to have an outer diameter of about 12 cm that is the same as that of a CD (Compact Disc), a DVD (Digital Versatile Disc), and a BD (Blu-ray Disc, registered trade mark).

Figures 2A, 2B:
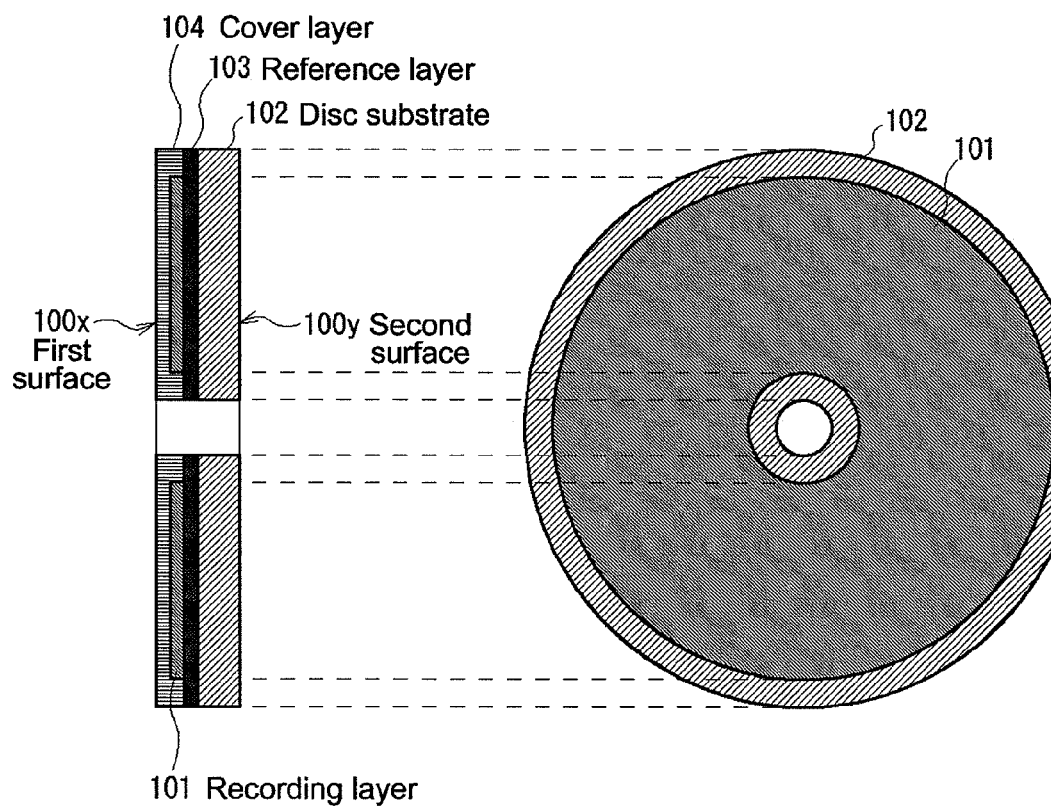
FIGS. 2A and 2B are simplified diagrams showing a structure of the optical disc.

As shown in FIG. 2A that is a cross-sectional diagram, the optical disc 100 has a structure in which both surfaces of a recording layer 101 for recording information are interposed between a disc substrate 102 and a cover layer 104, and further has a reference layer 103 between the recording layer 101 and the disc substrate 102.

An outer diameter of the recording layer 101 is formed to be smaller than that of the optical disc 100 by about 1 to 20 mm. An inner diameter of the recording layer 101 is formed to be larger than an outer diameter of the hole portion 100H by about 1 to 20 mm. In an innermost circumferential area and an outermost circumferential area of the optical disc 100 in which the recording layer 101 does not exist, the cover layer 104 is adjacent to the reference layer 103.

The reference layer 103 is formed with a guide groove for servo. Specifically, the guide groove forms a spiral or concentric track (hereinafter, referred to as reference track) TR by a land and groove or a pit as in a general BD-R (Recordable) disc or the like.

Further, the reference layer 103 is made of a dielectric film or the like, and reflects a blue-violet light beam having a wavelength of about 405 nm and a red light beam having a wavelength of about 660 nm at a high reflectance, for example.

In the optical disc 100, a servo light beam for servo having a wavelength of 660 nm is focused on the reference layer 103, and an information light beam for recording and reproduction having a wavelength of 405 nm is focused on the recording layer 101 with the reference layer 103 being as a reference.

When an information light beam having a relatively large intensity is irradiated to the recording layer 101, recording marks are formed due to modulation of a refractive index. By irradiation of the information light beam while a focal point is moved in a thickness direction of the recording layer 101, a plurality of mark layers on which recording marks RM are arranged in the thickness direction are formed on the recording layer 101.

The recording layer 101 desirably has a thickness t1 equal to or larger than 0.05 mm, and particularly equal to or larger than 0.1 mm. When the recording layer 101 is made thin, it is difficult to arrange many recording marks RM in the thickness direction of the recording layer 101 and increase a storage capacity as the optical disc 100, which is not desirable.

The recording layer 101 desirably has a thickness equal to or smaller than 1.2 mm, and particularly equal to or smaller than 1.0 mm. When the recording layer 101 is made thick, a spherical aberration of the irradiated light beam is increased on a deep side, which is not desirable.

The cover layer 104 is made of various optical materials such as an acrylic resin and a polycarbonate resin and transmits light at a high proportion.

In this connection, the thickness adding the cover layer 104 that transmits light and the recording layer 101 is desirably equal to or smaller than 1.2 mm. This is because, if the thickness is larger than 1.2 mm, astigmatism of a recording light beam that is caused within the optical disc 100 is increased when a surface of the optical disc 100 is inclined.

The disc substrate 102 is made of a hard resin material, glass, or the like and assumes a physical strength of the entire optical disc 100. The disc substrate 102 may be an optical material having high transmittance or a material that does not transmit light. The disc substrate 102 desirably has a thickness equal to or larger than 0.3 mm in order to secure the physical strength.

It should be noted that a specific structure of an optical disc apparatus that irradiates the servo light beam and the information light beam onto the optical disc 100 is described in Patent Document 1 and Japanese Patent Application No. 2007-168991.

In actuality, the optical disc 100 is manufactured in the following procedure.

The reference layer 103 is formed by sputtering or the like on the disc substrate 102 that is produced by injection molding or the like. On the disc substrate 102 including the reference layer 103, the recording layer 101 is molded by a method of molding a recording layer that is described later.

Then, on the disc substrate 102 on which the recording layer 101 is molded, the cover layer 104 is formed by applying a UV curable resin by spin coating and irradiating ultraviolet rays, for example.

1-2. Molding of Recording Layer

The recording layer 101 is constituted of an energy curable resin that is cured in accordance with irradiation of various types of energy, such as a photo-curing resin that is cured by light, a thermosetting resin that is cured by heat, a microwave-curing resin that is cured by a microwave, and a moisture-curing resin that is cured by moisture, a silicate compound, and their combination. The recording layer 101 is formed by curing a liquid resin material (hereinafter, referred to as liquid material) by light, heat, moisture, a microwave, or their combination.

It should be noted that examples of the irradiated energy include active energy rays such as electron rays, ultraviolet rays, visible light, infrared rays, and a microwave, and a method of promoting curing by heating with the use of an oven, a hot plate, or the like can be used.

The liquid material contains, as a main component, a monomer or oligomer (hereinafter, referred to as monomers) and a polymerization initiator that initiates polymerization by light, heat, or a microwave, or a curing agent or catalyst that cures monomers.

Though not particularly limited, viscosity of the liquid material is desirably equal to or smaller than 3,500 mPa/s, and particularly equal to or smaller than 1,000 mPa/s. This is because, when the viscosity becomes large, flowability of the liquid material is lowered, a filling speed is lowered, and thus productivity is lowered.

The recording layer 101 is molded on the disc substrate 102 on which the reference layer 103 has been formed (hereinafter, referred to simply as disc substrate 102, omitting reference layer 103 in figures as well).

Figure 3:
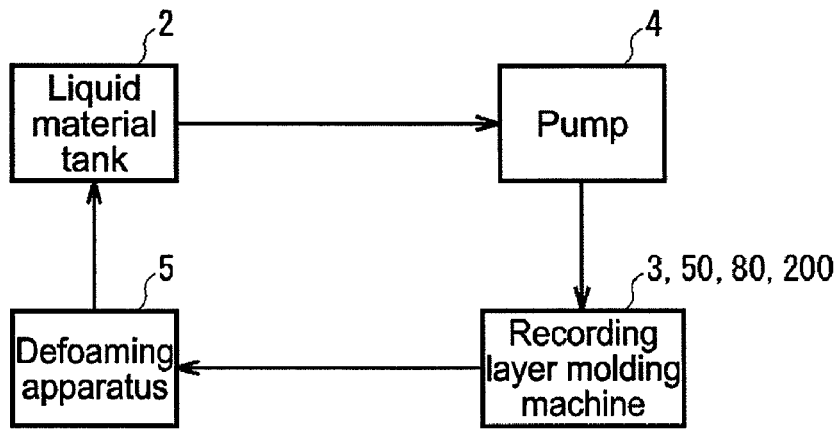
FIG. 3 is a simplified diagram showing a structure of a recording layer manufacturing apparatus.

As shown in FIG. 3, the recording layer 101 is manufactured by a recording layer manufacturing apparatus 1. In a liquid material tank 2 of the recording layer manufacturing apparatus 1, a defoamed liquid material is stored. A pump 4 pressurizes and supplies the liquid material that is pumped up from the liquid material tank 2 to a recording layer molding machine 3. The liquid material that overflows from the recording layer molding machine 3 is supplied to a defoaming apparatus 5 and after being defoamed, returned to the liquid material tank 2.

A casting cell SL using the disc substrate 102 is fitted into the recording layer molding machine 3, and the liquid material is filled into an injection space JS that is formed by the casting cell SL. The casting cell SL into which the liquid material has been filled is removed from the recording layer molding machine 3, and the liquid material is cured by energy applied in accordance with a type of the liquid material.

Accordingly, the liquid material is cured and the recording layer 101 is formed on the disc substrate 102. The disc substrate 102 on which the recording layer 101 has been formed is then removed from the casting cell SL, and the cover layer 104 is formed in the next process.

Further, the casting cell SL may be applied with energy in a state where the casting cell SL is fitted into the recording layer molding machine 3. In this case, the casting cell SL after the liquid material is cured is removed from the recording layer molding machine 3.

Specifically, as shown in FIGS. 4A and 4B, an outer circumferential side spacer 11 and an inner circumferential side spacer 12 (hereinafter, referred to as spacer group) are first placed on the disc substrate 102, and then a flat plate 15 (FIG. 4C) is placed thereon, to thereby be tentatively fixed. Hereinafter, the disc substrate 102 on which the spacer group and the flat plate 15 are tentatively fixed is referred to as a casting cell SL. In the casting cell SL, a liquid material is filled into a gap between the disc substrate 102 and the flat plate 15, the gap being formed by the spacer group (that is, circular plate-shaped injection space JS like a doughnut shape, including a center hole portion SLh).

Accordingly, the outer circumferential side spacer 11 and the inner circumferential side spacer 12 are necessary to have a sealing function of sealing in the liquid material, in addition to a spacer function of forming a space. The spacer group is formed so that the thickness thereof is substantially the same as or slightly larger than the thickness t1 of the recording layer 101. As the spacer group, a material that has appropriate flexibility and comes into close contact with the disc substrate 102 and the flat plate 15 is used.

For example, as the spacer group, a film in which a pressure sensitive adhesive layer is provided on one surface or both surfaces of a core film including a low elastic modulus film such as a silicon film, an adhesive film made of a thermoplastic resin, a PET (PolyEthylene Terephthalate), and the like can be used.

The outer circumferential side spacer 11 has a shape of an annular band and an outer diameter thereof is substantially the same as an outer diameter of the disc substrate 102. The outer circumferential side spacer 11 has a width of 1 to 10 mm and an inner diameter that is smaller than the outer diameter of the disc substrate 102 by about 1 to 20 mm.

The inner circumferential side spacer 12 includes two members, each of which has a shape like an annular band substantially divided into halves. The inner circumferential side spacer 12 has an inner diameter that is substantially the same as an inner diameter of the disc substrate 102. The inner circumferential side spacer 12 has a width of 1 to 10 mm and an outer diameter that is larger than the inner diameter of the disc substrate 102 by 1 to 20 mm. The two members of the inner circumferential side spacer 12 are placed away from each other, with the result that two opening portions (injection opening portion 12A and discharge opening portion 12B) are formed between the two members.

The flat plate 15 is formed in the same shape as that of the disc substrate 102 constituted of a doughnut-shaped circular plate, for example. A thickness of the flat plate ta is arbitrary selected from a range in which a physical strength can be secured. It should be noted that since the flat plate 15 comes into close contact with the spacer group and is used only for forming the injection space JS into which the liquid material is injected, the shape and thickness ta thereof are not limited as long as the flat plate 15 has a size and flatness enough to seal the casting cell SL. Further, by performing mold release treatment on a surface side of the flat plate 15 that comes into close contact with the spacer group, it is possible to easily detach the cured liquid material (that is, recording layer 101).

As shown in FIG. 5, the casting cell SL is placed within a base mold 31. The base mold 31 has a circular plate-shaped depression 31A like a doughnut shape that is substantially the same shape as the disc substrate 102, and the casting cell SL is placed on the depression 31A so as to be fitted thereinto.

The height of the depression 31A is not particularly limited, but formed to be the same as that of the disc substrate 102, for example.

A cover mold 32 is then placed on an upper portion of the base mold 31, and the base mold 31 and the cover mold 32 are fixed using a fixing tool such as a jig and a screw (not shown), thus forming the recording layer molding machine 3.

Figure 6:
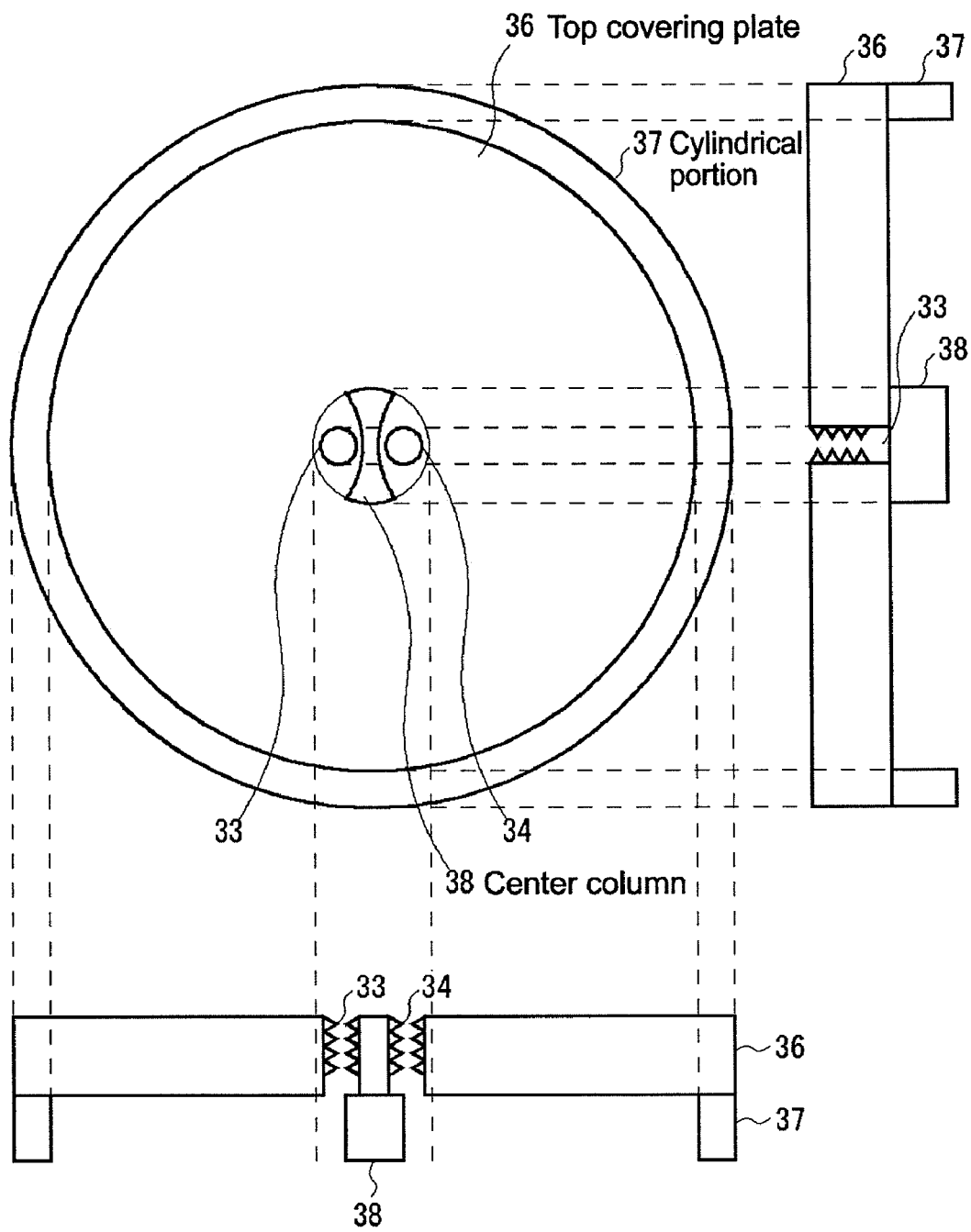
FIG. 6 is a simplified diagram showing a structure of a cover mold according to the first embodiment.

As shown in FIG. 6, the cover mold 32 includes a top covering plate 36 that has a circular plate shape, a cylindrical portion 37 that protrudes along a circumference of the top covering plate 36, and a center column 38 that protrudes in a columnar manner from the center of the top covering plate 36. The cylindrical portion 37 and the center column 38 have no limitation on the height thereof, but are formed to have the height obtained by adding the thickness t1 of the recording layer 101 and the thickness of the flat plate ta, for example.

In other words, the recording layer molding machine 3 is formed so that the height adding the height of the depression 31A in the base mold 31 and that of the cylindrical portion 37 is set to be the same as a thickness t1+ta+t2, which is obtained by adding a thickness t2 of the disc substrate 102, the thickness t1 of the recording layer 101, and the thickness of the flat plate to (hereinafter, referred to as thickness of casting cell).

With this structure, in the recording layer molding machine 3, an internal space IS having the height that is the same as the thickness of the casting cell can be formed. That is, in the recording layer molding machine 3, the height of the injection space JS that is formed in the casting cell SL and into which the liquid material is injected, can be set to the thickness t1 of the recording layer 101. Further, the cover mold 32 includes not only the cylindrical portion 37 but also the center column 38, with the result that the height of the injection space JS can be set to the thickness t1 of the recording layer 101 over the entire area thereof without depressing a center portion. The center column 38 bears a role as a weir for preventing the liquid material from leaking from an opening portion of the casting cell SL by a bottom portion thereof abutting on a center protrusion 31B of the base mold 31.

Portions of the center column 38 on the outer side that correspond to the height of the injection space JS from the bottom are provided with semicircular notches that are located opposite to each other. Each of the notches is provided with an opening portion of a through-hole that communicates with an injection nozzle receiving portion 33 or a discharge nozzle receiving portion 34. It should be noted that the notches are provided for the purpose of mainly controlling an injection direction and a discharge direction of the liquid material.

The cover mold 32 (FIG. 5) includes the injection nozzle receiving portion 33 and the discharge nozzle receiving portion 34 at a center portion thereof. A fitting portion 23 provided at a tip of an injection nozzle 21 is inserted into the injection nozzle receiving portion 33. The fitting portion 23 is formed with a male screw and the injection nozzle receiving portion 33 is formed with a female screw so that a gap is not formed between the fitting portion 23 and the injection nozzle receiving portion 33.

As in the case of the injection nozzle receiving portion 33, a fitting portion 43 provided at a tip of a discharge nozzle 41 is inserted into the discharge nozzle receiving portion 34 so that a gap is not formed between the fitting portion 43 and the discharge nozzle receiving portion 34.

As a result, the inside of the recording layer molding machine 3 can be hermetically sealed in an almost perfect manner except the injection nozzle 21 and the discharge nozzle 41.

The injection nozzle 21 is attached to a tip of an injection hose 22 that extends from the liquid material tank 2 via the pump 4, and supplies a liquid material supplied from the liquid material tank 2 to the inside of the recording layer molding machine 3 under increased pressure.

In this case, in the recording layer molding machine 3, the injection nozzle receiving portion 33 and the injection opening portion 12A are connected to each other, and thus the tip of the injection nozzle 21 is almost adjacent to the injection opening portion 12A of the casting cell SL. Accordingly, the injection nozzle 21 pressurizes and fills the liquid material into the casting cell SL from the injection opening portion 12A.

When the liquid material is filled into the casting cell SL, a pressure is applied in a direction in which the disc substrate 102 and the flat plate 15 are separated from each other. In this case, the entire surface of the disc substrate 102 is brought into contact with the depression 31A of the base mold 31. Further, the entire surface of the flat plate 15 is brought into contact with the top covering plate 36 of the cover mold 32.

Accordingly, the recording layer molding machine 3 can keep the gap between the disc substrate 102 and the flat plate 15 constant with respect to the pressure applied along with the injection of the liquid material. As a result, the recording layer molding machine 3 can keep the thickness of the recording layer 101 with high accuracy.

Figure 7:
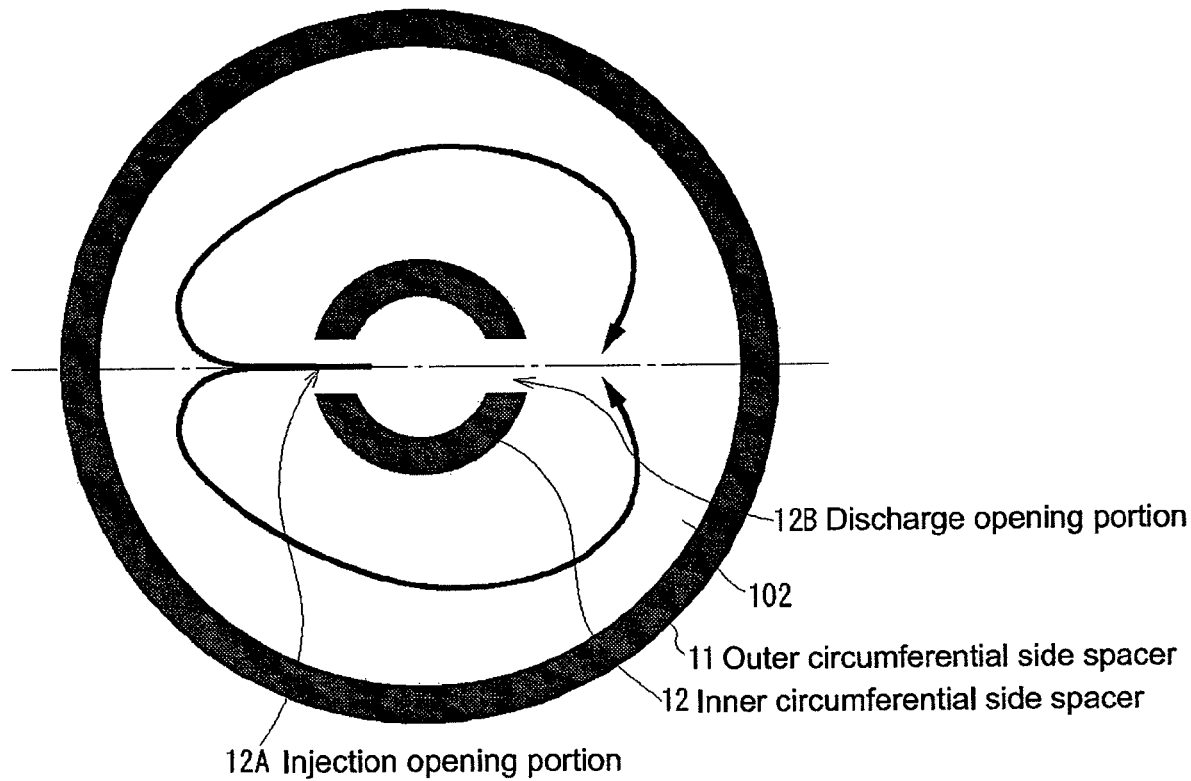
FIG. 7 is a simplified diagram for explaining positions of opening portions.

As shown in FIG. 7, the liquid material filled from the injection opening portion 12A bumps into the outer circumferential side spacer 11 and pushed out in a circumferential direction along the outer circumferential side spacer 11. At that time, the liquid material on the inner circumferential side moves at a slow movement speed but has a small distance to move, as compared to the outer circumferential side. Accordingly, the liquid material on the inner circumferential side can advance without significant delay from the liquid material on the outer circumferential side.

Air that exists in the injection space JS of the casting cell SL is pushed out and discharged from the discharge opening portion 12B via the discharge nozzle 41. When the liquid material is filled into the injection space JS formed in the casting cell SL, the liquid material overflows from the discharge opening portion 12B and is supplied via the discharge nozzle 41 to the defoaming apparatus 5 that is installed on a basal portion side of a hose 42.

In other words, the liquid material is injected from the injection opening portion 12A and branched in clockwise and counterclockwise directions, thus eventually bumping against each other on a side opposite to the injection opening portion 12A (that is, opposite to a side on which the liquid material injected from the injection opening portion 12A advances from the inner circumferential side to the outer circumferential side). Therefore, the discharge opening portion 12B is desirably provided on a straight line passing through the injection opening portion 12A and the center point of the disc substrate 102 and on the opposite side of the injection opening portion 12A.

Further, in a case where the injection opening portion 12A is provided to the outer circumferential side spacer 11 and a flow of the liquid material is caused on one side of the center hole portion SLh, the liquid material may be discharged from the discharge opening portion 12B while not sufficiently filling the other side, which is not desirable.

Then, the casting cell SL is detached from the recording layer molding machine 3 and energy in accordance with the type of the liquid material is applied. As a result, the liquid material filled into the injection space JS is cured. In a case where energy rays such as a light beam and electron rays are used as that energy, a material that transmits the energy rays is selected for at least one of the disc substrate 102 and the flat plate 15 of the casting cell SL.

It should be noted that when the casting cell SL is detached for curing, the viscosity of the liquid material is desirably equal to or larger than 50 mPa/s. This is because when the viscosity of the liquid material is less than 50 mPa/s, air is liable to penetrate from the opening portion (injection opening portion 12A or discharge opening portion 12B).

Here, there is a probability that in the disc substrate 102, the energy rays are shielded by the reference layer 103, and thus a material that transmits the irradiated energy rays is desirably selected as the flat plate 15. In this case, the energy rays are irradiated from the flat plate 15 side. Of course it is possible to use a material that transmits energy rays for the disc substrate 102 and the reference layer 103.

In addition, in a case where the energy rays are irradiated without detaching the casting cell SL from the recording layer molding machine 3, the base mold 31 or the cover mold 32 is structured to transmit energy by selection of a material. In this case, the opening portion of the casting cell SL is not opened, and therefore air does not penetrate from that opening portion. Accordingly, the viscosity of the liquid material can be freely set.

In a case where energy is irradiated from the cover mold 32 side, it is only necessary to cause the energy to be transmitted at only a portion where the recording layer 101 is formed. That is, an area corresponding to the hole portion 100H in which the recording layer 101 is not formed (injection nozzle receiving portion 33, discharge nozzle receiving portion 34, and center column 38) can be formed of a material that shields the energy (for example, metal).

Further, it is also possible to detach only the cover mold 32 and irradiate energy with the casting cell SL being fitted into the base mold 31, for example. In this case, the material of the cover mold 32 can be freely selected.

Moreover, in a case where the liquid material is cured by heat, the flat plate 15 is desirably formed of a material having high heat conductivity, such as metal and glass. In a case where the casting cell SL is heated without being detached from the recording layer molding machine 3, the heat conductivity of the base mold 31 and that of the cover mold 32 are also increased. In addition, it is possible to provide a heating mechanism to one of or both the base mold 31 and the cover mold 32.

As described above, it is possible to mold the recording layer 101 on the disc substrate 102 by fitting the casting cell SL that partially incorporates the disc substrate 102 into the recording layer molding machine 3 and pressure-filling the liquid material by a sealing system.

1-3. Example

Next, results of experiments in which the recording layer 101 is actually molded using the recording layer molding machine 3 described above will be described.

1-3-1. Example 1

Circular doughnut-shaped glass having a diameter of 120 mm, a diameter of a center hole portion of 15 mm, and a thickness of 0.6 mm was used as the disc substrate 102 and the flat plate 15. Further, in order to produce a spacer, a three-layer bonding film having a thickness of 300 μm in which a low-density polyethylene film having a thickness of 220 μm was used as a core material and a polyethylene-based hot melt adhesive layer having a thickness of 40 μm was formed on both surfaces was prepared.

An annular band having an outer diameter of 120 mm and a width of 2 mm was punched out from the three-layer bonding film, and the resultant was assumed as the outer circumferential side spacer 11. Further, an annular band having an outer diameter of 19 mm and a width of 2 mm was punched out from the three-layer bonding film, and the resultant was assumed as the inner circumferential side spacer 12. It should be noted that the inner circumferential side spacer 12 was formed with the opening portions having a width of 5 mm (injection opening portion 12A and discharge opening portion 12B) on opposite sides.

The inner circumferential side spacer 12 was placed along a center hole portion 102H of the disc substrate 102 and the outer circumferential side spacer 11 was placed along an outer edge of the disc substrate 102. The flat plate 15 was placed on the spacer group and the spacer group, the disc substrate 102, and the flat plate 15 were attached by thermocompression bonding at 150° C. for ten seconds, thus producing the casting cell SL. It should be noted that a mold release agent commercially available was sprayed on a surface side of the flat plate 15, to which the disc substrate 102 was opposed (side to be attached to spacer group).

As the liquid material, two kinds of mixed monomers containing a methyl methacrylate monomer were used. The viscosities of those liquid materials were 50 mPa/s and 420 mPa/s. It should be noted that conditions of viscosity measurement are shown below. The viscosity measurement executed herein is carried out according to the following conditions.

Viscometer: AERS Rheometer (manufactured by TA Instruments)

Shear rate: 100 l/sec

Measurement temperature: 25° C.

Amount of varnish (liquid material): 1 ml

The cover mold 32 made of aluminum and the base mold 31 made of PET were used.

By inserting the center hole portion SLh of the casting cell SL into the center protrusion 31B of the base mold 31 (FIG. 5), the casting cell SL was fitted into the depression 31A. The height of the depression 31A was set to 0.6 mm that was the same as the thickness t2 of the disc substrate 102. The diameter of the center protrusion 31B was 15 mm and the height thereof was 0.6 mm, which were the same as the diameter of the center hole portion 102H and the thickness t2 of the disc substrate 102, respectively.

The cover mold 32 was placed on the base mold 31 and fixed in a state where the entire casting cell SL was uniformly applied with a pressure. In this case, the casting cell SL was positioned so that the injection nozzle receiving portion 33 was connected to the injection opening portion 12A and the discharge nozzle receiving portion 34 was connected to the discharge opening portion 12B, the injection nozzle receiving portion 33 and the discharge nozzle receiving portion 34 being formed to the notches of the center column 38 of the cover mold 32.

The liquid material was pressure-injected into the casting cell SL in the recording layer molding machine 3 via the injection nozzle 21. Along with the injection of the liquid material, air within the casting cell SL was discharged via the discharge nozzle 41. Later, the entire injection space JS formed by the casting cell SL was filled with the liquid material and the liquid material overflowing from the injection space JS was discharged via the discharge nozzle 41. At a time point at which the discharge of the liquid material from the discharge nozzle 41 was checked, the injection of the liquid material was stopped.

The casting cell SL was detached from the recording layer molding machine 3 and heated in an oven at 100° C. for 20 minutes, and the liquid material was thus cured. Then, the flat plate 15 and the spacer group were removed from the casting cell SL. In such a manner, the recording layer 101 was molded on the disc substrate 102.

Though the liquid materials of two kinds of viscosities were used in this example, air did not penetrate to the liquid materials and an excellent recording layer 101 could be formed.

1-3-2. Example 2

In this example, a microwave-curing resin cured by irradiation of a microwave was used as the liquid material. It should be noted that the viscosity of the liquid material was the same as in Example 1.

Similar to Example 1, the liquid material was filled into the casting cell SL. The casting cell SL was taken out from the recording layer molding machine 3 and irradiated with a microwave for 3 minutes, and thus the liquid material was cured. Then, the flat plate 15 and the spacer group were removed from the casting cell SL.

In this example as well, air did not penetrate to the recording layer 101, and an excellent recording layer 101 was formed.

1-3-3. Example 3

In this example, a UV curable resin cured by irradiation of ultraviolet rays was used as the liquid material. It should be noted that the viscosity of the liquid material was the same as in Example 1.

Similar to Example 1, the liquid material was filled into the casting cell SL. The liquid material was cured by irradiating ultraviolet rays from a base mold 31 side with the casting cell SL being fitted into the recording layer molding machine 3. Then, the flat plate 15 and the spacer group were removed from the casting cell SL.

In this example as well, air did not penetrate to the recording layer 101, and an excellent recording layer 101 was formed.

1-3-4. Comparative Example 1

In this comparative example, a UV curable resin cured by irradiation of ultraviolet rays was used as the liquid material. It should be noted that four kinds of UV curable resins were prepared as the liquid material, and viscosities thereof were 5, 10, 20, and 40 mPa/s.

Similar to Example 1, the liquid material was filled into the casting cell SL. The casting cell SL was taken out from the recording layer molding machine 3 and ultraviolet rays were irradiated from the base mold 31 side, thus curing the liquid material. Then, the flat plate 15 and the spacer group were removed from the casting cell SL.

In this comparative example, it was found that air penetrated to the recording layer 101 when the casting cell SL was taken out from the recording layer molding machine 3.

1-3-5. Example 4

In this example, a UV curable resin made in the same formula as in Comparative example 1 was used.

Similar to Example 1, the liquid material was filled into the casting cell SL. The liquid material was cured by irradiating ultraviolet rays from the base mold 31 side with the casting cell SL being fitted into the recording layer molding machine 3. Then, the flat plate 15 and the spacer group were removed from the casting cell SL.

In this example as well, air did not penetrate to the recording layer 101, and an excellent recording layer 101 was formed. In other words, it was found that even in a case where a liquid material having low viscosity was used, an excellent recording layer 101 could be formed by taking out the casting cell SL from the recording layer molding machine 3 after the curing.

1-3-6. Comparative Example 2

In this comparative example, the casting cell SL was formed as in Example 1, using a spacer group including the discharge opening portion 12B in the inner circumferential side spacer 12 and an injection opening portion 11A in the outer circumferential side spacer 11. As the cover mold 32, a cover mold provided with the injection nozzle receiving portion 33 at an outer circumferential portion was used.

Similar to Example 1, the liquid material was filled into the casting cell SL. The liquid material was cured by irradiating ultraviolet rays from the base mold 31 side with the casting cell SL being fitted into the recording layer molding machine 3. Then, the flat plate 15 and the spacer group were removed from the casting cell SL.

In this comparative example, it was found that air remained in the recording layer 101. It was thought because the liquid material injected from the injection opening portion 11A was linearly headed to the discharge opening portion 12B, and could not adequately reach an outer circumferential portion swelling at the right angle when viewed from a straight line connecting the injection opening portion 11A and the discharge opening portion 12B.

1-3-7. Summary

From the above results, it was found that an excellent recording layer 101 could be formed on the substrate 102 by using the recording layer molding machine 3, irrespective of the viscosity of the liquid material. In a case where the liquid material is cured after the casting cell SL is detached from the recording layer molding machine 3, the viscosity of the liquid material is desirably equal to or larger than 50 mPa/s. Further, in a case where the liquid material was cured without taking out the casting cell SL from the recording layer molding machine 3, an excellent recording layer 101 could be formed even when the viscosity of the liquid material was smaller than 50 mPa/s.

As to the liquid material, no difference was found in any of the thermosetting resin, the UV curable resin, and the microwave-curing resin, and an excellent recording layer 101 was formed.

In the case where the liquid material was injected from the injection opening portion 11A provided to the outer circumferential side spacer 11, the remaining air was found. In contrast, in the case where the liquid material was injected from the injection opening portion 12A provided to the inner circumferential side spacer 12, an excellent recording layer 101 in which no air remained was formed.

1-4. Operation and Effect

In the structure described above, the following optical disc 100 is manufactured in an optical disc manufacturing method of the embodiment of the present invention. The optical disc 100 is formed by the base mold 31 and the cover mold 32 via the casting cell SL. The liquid material is injected to the circular plate-shaped injection space JS having the center hole portion SLh at the center from the injection nozzle receiving portion 33 serving as an injection hole that is formed to be connected to an inner edge portion of the injection space JS. The optical disc 100 is formed in a plane direction of the circular plate in the injection space JS on the straight line passing through the injection nozzle receiving portion 33 and the center of the center hole portion SLh. Air is discharged from the discharge nozzle receiving portion 34 serving as a discharge hole that is positioned on an opposite side of the injection nozzle receiving portion 33.

The liquid material injected into the injection space JS is cured and the spacer group and the flat plate 15 are removed, thus taking out the recording layer 101 that is the cured liquid material from the injection space JS.

Here, the spin coating described above is used as an optical disc manufacturing method of related art. In actuality, a protective layer of a BD having a thickness of 0.1 mm is formed of a UV curable resin that is applied by spin coating and then cured. However, the spin coating is a method appropriate for a thin film having a thickness less than 0.05 mm, and accordingly the viscosity of the UV curable resin is adjusted to 200 mPa/s or more, for example, in order to form a thick protective layer of 0.1 mm.

In other words, since the spin coating needs the viscosity adjustment, the design of the liquid material is limited and it may become impossible to use an arbitrary resin in accordance with characteristics of the recording layer 101.

Further, as the optical disc manufacturing method of related art, injection molding is used. In actuality, a substrate of a BD having a thickness of 1.1 mm or a substrate of a DVD having a thickness of 0.6 mm is formed by the injection molding. However, the injection molding is a technique to spread the liquid material to every part by applying an extremely large pressure. In the technique, the viscosity of the liquid material has to be about 1,000 mPa/s in order to prevent the liquid material from leaking from a mold. That is, in the technique in which such a large pressure is applied, it may be impossible to use a curable resin having low viscosity such as a resin used in this embodiment.

On the other hand, in the embodiment of the present invention, the injection nozzle receiving portion 33 is provided on the inner circumferential side and the liquid material is injected so that the liquid material is caused to bump into the outer edge of the injection space JS and advance along the outer circumferential side. With this structure, in the embodiment of the present invention, it is possible to cause the injected liquid material to advance almost simultaneously on the outer circumferential side in which a movement distance is large and the inner circumferential side in which the movement distance is small, and cause the discharge nozzle receiving portion 34 to subsequently push out the air so that the air is not left.

In actuality, it was confirmed, in the experiments using the liquid material of various viscosities, that the recording layer 101 could be formed without penetration of air in the circular plate-shaped optical disc 100 like a doughnut shape.

In the embodiment of the present invention, the liquid material is pressure-injected when being injected. Accordingly, air in the injection space JS can be appropriately pushed out in the embodiment of the present invention. In addition, it is possible to increase a filling speed of the liquid material with respect to the injection space JS and increase productivity in the embodiment of the present invention.

The injection space JS has the thickness t1 equal to or larger than 0.05 mm and equal to or smaller than 1.0 mm, the thickness t1 being perpendicular to the plane direction of the circular plate. Accordingly, in the embodiment of the present invention, the recording layer 101 made of a thick film can be formed without the penetration of air.

The injection space JS is formed via the casting cell SL in which the spacer group (outer circumferential side spacer 11 and inner circumferential side spacer 12) serving as a spacer that comes into close contact with two circular plates, the substrate 102 and the flat plate 15, is installed between the two circular plates. Accordingly, it is possible to form the casting cell SL in which the injection space JS is formed with a simple structure in the embodiment of the present invention.

The casting cell SL forming the injection space JS is held in the internal space IS that is formed by the base mold 31 on which the casting cell SL is placed and the cover mold 32 that covers an upper portion of the base mold 31, and has the same thickness as the casting cell.

Accordingly, since the liquid material is not directly injected into the internal space IS in the embodiment of the present invention, the cover mold 32 having a complicated structure and including the injection nozzle receiving portion 33 and the discharge nozzle receiving portion 34 that are necessary to form the internal space IS of the sealing system can avoid contact with the liquid material.

With this structure, in the embodiment of the present invention, it is possible to omit a cleaning process of the cover mold 32 from the manufacturing process of the recording layer 101 and increase productivity.

One of the two circular plates is the substrate 102 on which the reference layer 103 is formed, the substrate 102 serving as an adjacent layer adjacent to the cured liquid material. Accordingly, since the recording layer 101 can be directly formed on the substrate 102 in the embodiment of the present invention, it is possible to simplify the process as compared to a method of forming the recording layer 101 alone to be bonded.

When the liquid material is cured by applying energy, the casting cell SL is taken out from the internal space IS. Accordingly, the embodiment of the present invention is free from the consideration of properties of the base mold 31 and the cover mold 32 with respect to energy, with the result that an arbitrary material can be selected for the base mold 31 and the cover mold 32.

When the liquid material is cured by applying energy, the casting cell SL is held in the internal space IS. Accordingly, in the embodiment of the present invention, it is possible to prevent air from penetrating to the injection space JS by the base mold 31 or the cover mold 32 constituting the internal space IS even when the viscosity of the liquid material is equal to or smaller than 40 mPa/s, which is low. Further, in the embodiment of the present invention, the recording layer 101 can be molded with the film thickness being kept uniform by the recording layer molding machine 3.

When the liquid material is cured by applying energy, the casting cell SL is held within the base mold 31 with the cover mold 32 being detached. Accordingly, in the embodiment of the present invention, the casting cell SL is unnecessary to be applied with vibration in order to detach the casting cell SL from the base mold 31, with the result that it is possible to prevent air from penetrating to the injection space JS. Moreover, since energy can be applied with the cover mold 32 being detached, an arbitrary material can be selected as the cover mold 32.

The cured liquid material is the recording layer 101 in which a plurality of three-dimensional recording marks are formed due to the modulation of a refractive index so as to overlap in a thickness direction. Accordingly, in the embodiment of the present invention, a recording layer 101 used in a volumetric recording medium can be excellently manufactured.

In the embodiment of the present invention, an excellent recording layer 101 can be formed even when a liquid material having viscosity smaller than 3,500 mPa/s, to which a large pressure may not be applied because leakage is caused, is used.

In the embodiment of the present invention, it was actually found that an excellent recording layer 101 could be formed when a liquid material having viscosity larger than 5 mPa/s was used.

In the embodiment of the present invention, it was found that by using a liquid material having viscosity larger than 40 mPa/s, air did not penetrate even when the casting cell SL was taken out from the base mold 31.

The liquid material contains any of an energy-ray curable resin, a thermosetting resin, and a silicate compound before curing. Accordingly, it is possible to rapidly cure the liquid material and increase mass productivity of the recording layer 101.

The energy rays are constituted of any of electron rays, ultraviolet rays, visible light, infrared rays, and a microwave, because liquid materials that are cured by those energy rays are available in the market, many irradiation apparatuses of energy rays exist, and security is secured.

The spacer group is made of an adhesive film whose one surface or both surfaces have adhesiveness. Accordingly, the spacer group comes into close contact with the substrate 102 and the flat plate 15, with the result that an injected liquid material can be reliably held back.

The recording layer molding machine 3 as an optical disc manufacturing apparatus of the embodiment of the present invention holds the casting cell SL that includes the circular plate-shaped injection space JS having the center hole portion SLh at the center thereof, with the result that the injection space JS is formed via the casting cell SL.

In order to inject the liquid material via the injection opening portion 12A, the recording layer molding machine 3 is provided with the injection nozzle receiving portion 33 that is connected to the inner edge portion of the injection space JS. In order to discharge air and the liquid material via the discharge opening portion 12B, the recording layer molding machine 3 is provided with the discharge nozzle receiving portion 34 serving as a discharge hole formed on a straight line passing through the injection nozzle receiving portion 33 and the center of the center hole portion SLh in the plane direction of the circular plate.

Accordingly, the recording layer molding machine 3 can inject the liquid material from the inner edge portion to the outer circumferential side of the injection space JS, with the result that air on the outer circumferential side of the injection space JS can be pushed out without applying a large pressure by moving the liquid material along the outer edge of the injection space JS.

With the structure described above, the recording layer molding machine 3 injects the liquid material into the circular plate-shaped injection space JS like a doughnut shape from the inner edge portion to the outer circumferential side so that the liquid material bumps into a wall on the outer circumferential side.

Accordingly, the recording layer molding machine 3 can preferentially inject the liquid material on the outer circumferential side where air is liable to remain and preferentially discharge the air on the outer circumferential side. In such a manner, in the embodiment of the present invention, it is possible to realize an optical disc manufacturing method and an optical disc manufacturing apparatus in which a doughnut-shaped circular plate having a uniform thickness can be manufactured.

2. Second Embodiment

2-1. Structure of Recording Layer Molding Machine

Figure 8A:
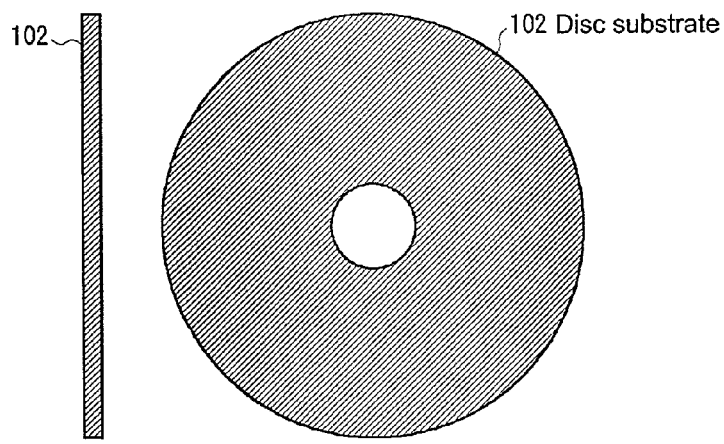
FIGS. 8A to 8C are simplified diagrams showing a structure (1) of a recording layer molding machine according to a second embodiment.
Figure 10:
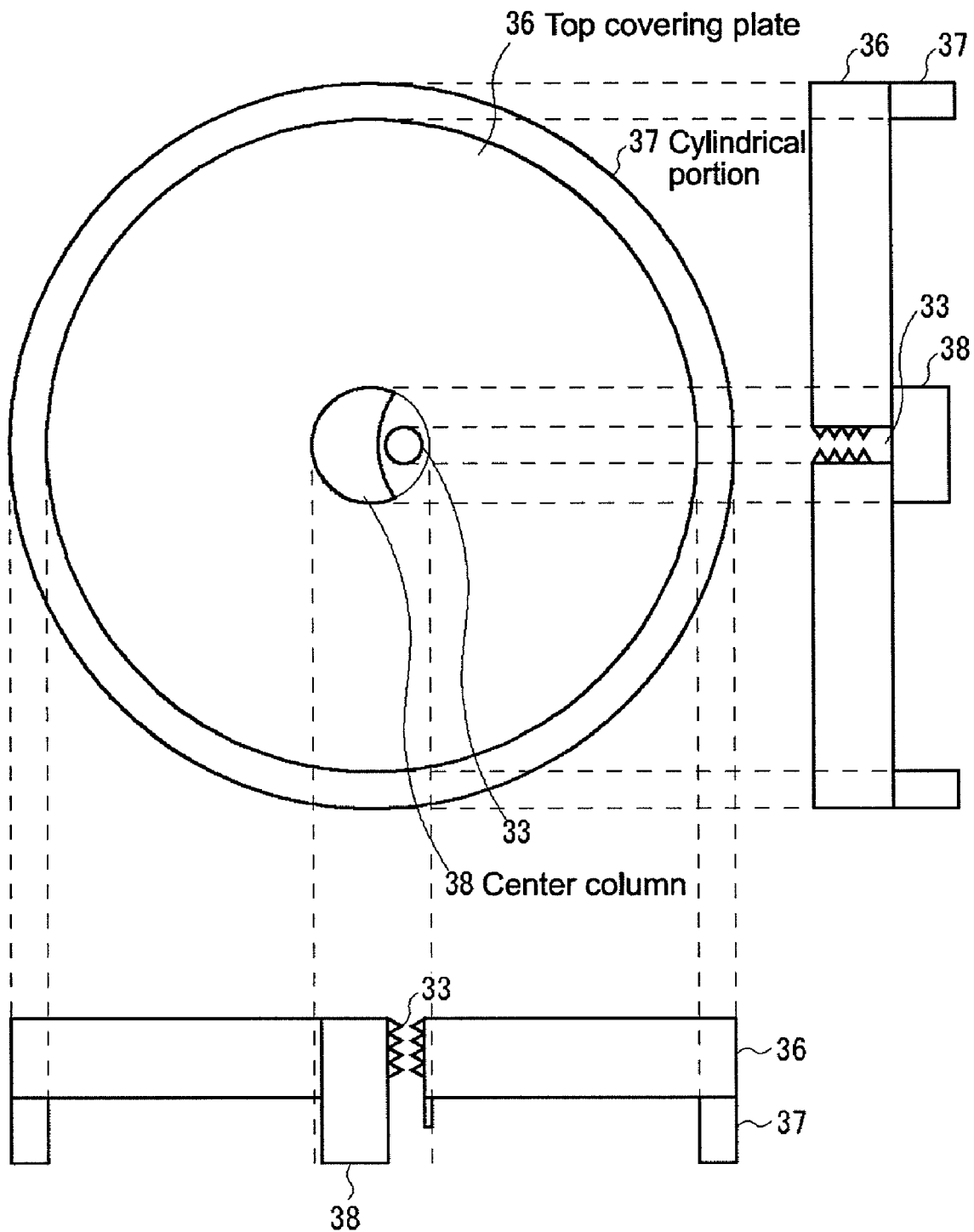
FIG. 10 is a simplified diagram showing a structure of a cover mold according to the second embodiment.

In a second embodiment shown in FIGS. 8 to 10, portions corresponding to those in the first embodiment shown in FIGS. 1 to 7 are denoted by the same reference symbols, and descriptions thereof are omitted. The second embodiment is different from the first embodiment in that an outer circumferential side spacer 51 corresponding to the outer circumferential side spacer 11 includes a discharge opening portion 51B.

Figure 8B:
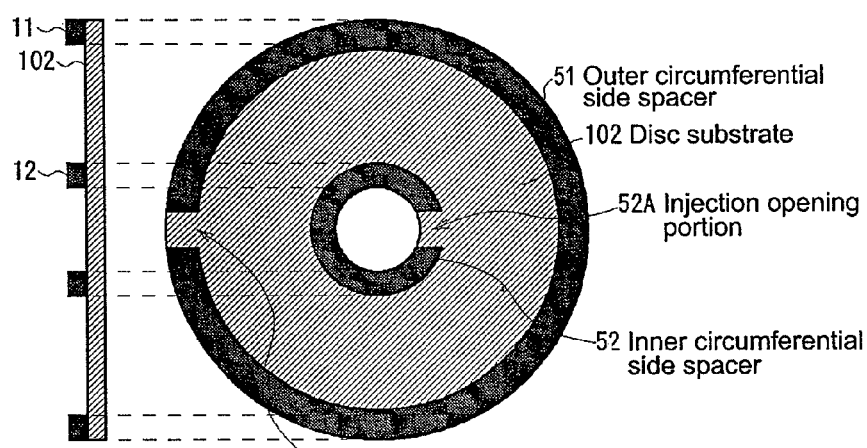

As shown in FIG. 8B, an inner circumferential side spacer 52 includes an injection opening portion 52A. The outer circumferential side spacer 51 includes the discharge opening portion 51B. The discharge opening portion 51B is provided on a straight line passing through the center of the disc substrate 102 and the injection opening portion 52A and on an opposite side of the injection opening portion 52A.

Figure 8C:
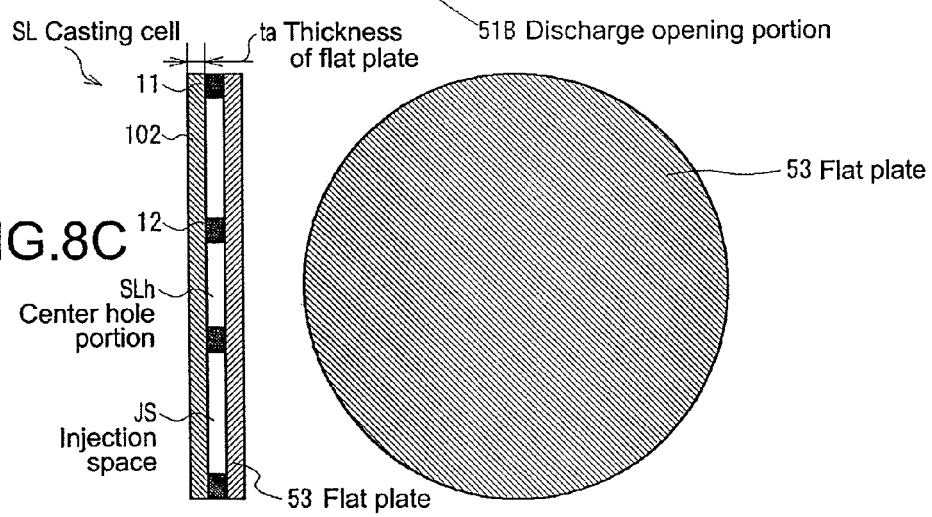

Further, as shown in FIG. 8C, a flat plate 53 corresponding to the flat plate 15 does not include a hole portion at the center and has a simple circular plate shape. Accordingly, leakage caused between the hole portion of the flat plate and a recording layer molding machine 50 can be prevented.

As shown in FIG. 9, in the recording layer molding machine 50 corresponding to the recording layer molding machine 3, the discharge nozzle receiving portion 34 is provided at an outer circumferential portion of a base mold 56 so that the discharge nozzle receiving portion 34 is connected to the discharge opening portion 51B provided to the outer circumferential side spacer 51.

As shown in FIG. 10, the center column 38 of a cover mold 55 is provided with only the injection nozzle receiving portion 33.

When the liquid material is supplied from the injection nozzle 21, the liquid material is filled into the casting cell SL from the injection opening portion 52A provided to the inner circumferential side spacer 52, and pushed-out air and an overflowing liquid material are discharged from the discharge nozzle 41 through the discharge opening portion 51B.

As described above, the recording layer molding machine 50 injects the liquid material from an inner circumferential side of the casting cell SL, and air and the liquid material are discharged from an outer circumferential side of the casting cell SL.

2-2. Example

2-2-1. Example 5

The casting cell SL was manufactured in the same manner as in Example 1 except that a circular plate having no center hole portion was used as the flat plate 53, the inner circumferential side spacer 52 was provided with only the injection opening portion 52A, and the outer circumferential side spacer 51 was provided with the discharge opening portion 51B. It should be noted that the viscosity of the liquid material was the same as in Example 1. The cover mold 55 made of aluminum and the base mold 56 made of PET were used.

The liquid material was filled into the casting cell SL as in Example 1 except that the recording layer molding machine 50 was used. The casting cell SL was taken out from the recording layer molding machine 50 and heated in an oven at 100° C. for 20 minutes, and the liquid material was thus cured. Then, the flat plate 53 and the spacer group were removed from the casting cell SL.

In this example as well, air did not penetrate to the recording layer 101 and an excellent recording layer 101 was formed.

2-2-2. Example 6

In this example, a microwave-curing resin cured by irradiating a microwave was used as the liquid material. It should be noted that the viscosity of the liquid material was the same as that in Example 1.

Similar to Example 5, the liquid material was filled into the casting cell SL. The casting cell SL was taken out from the recording layer molding machine 50 and a microwave was irradiated for 3 minutes so that the liquid material was cured. Then, the flat plate 53 and the spacer group were removed from the casting cell SL.

In this example as well, air did not penetrate to the recording layer 101 and an excellent recording layer 101 was formed.

2-2-3. Example 7

In this example, a UV curable resin cured by irradiating ultraviolet rays was used as the liquid material. It should be noted that the viscosity of the liquid material was the same as that in Example 1.

Similar to Example 5, the liquid material was filled into the casting cell SL. Ultraviolet rays were irradiated from the base mold 56 side with the casting cell SL being fitted into the recording layer molding machine 50, and accordingly the liquid material was cured. Then, the flat plate 53 and the spacer group were removed from the casting cell SL.

In this example as well, air did not penetrate to the recording layer 101 and an excellent recording layer 101 was formed.

2-2-4. Summary

From the above results, it was found that an excellent recording layer 101 could be molded even when the discharge opening portion 51B was provided to the outer circumferential side spacer 51.

Further, it was found that an excellent recording layer 101 could be formed even when the liquid material injected from an upper direction (cover mold 55) was discharged from a lower direction (base mold 56).

2-3. Operation and Effect

In the structure described above, the recording layer molding machine 50 was provided with the discharge nozzle receiving portion 34 serving as a discharge hole that was connected to an outer edge portion of the injection space JS. In this case as well, it was found that the recording layer molding machine 50 could form an excellent recording layer 101 without causing air to remain by the same action as that of the first embodiment.

The recording layer molding machine 50 was provided with the discharge nozzle receiving portion 34 in the lower direction of the injection space JS. In this case as well, it was found that the recording layer molding machine 50 could form an excellent recording layer 101 without causing air to remain by the same action as that of the first embodiment.

That is, in the injection space JS having the thickness t1 of 1.0 mm or less, which is small, even when the liquid material is injected or discharged from the upper direction or lower direction, that force is converted into a force directed to the plane direction of the injection space JS, with the result that the direction of the injection nozzle receiving portion 33 and discharge nozzle receiving portion 34 does not cause any problem in particular.

According to the structure described above, in the optical disc manufacturing method of the embodiment of the present invention, the liquid material was injected from the injection nozzle receiving portion 33 connected to the inner edge portion of the injection space JS, and air and the liquid material were discharged from the outer edge portion of the injection space JS, the outer edge portion being on the straight line passing through the injection nozzle receiving portion 33 and the center of the injection space JS and opposite to the injection nozzle receiving portion 33. Accordingly, the same effect as in the first embodiment can be obtained.

3. Third Embodiment

Figure 11:
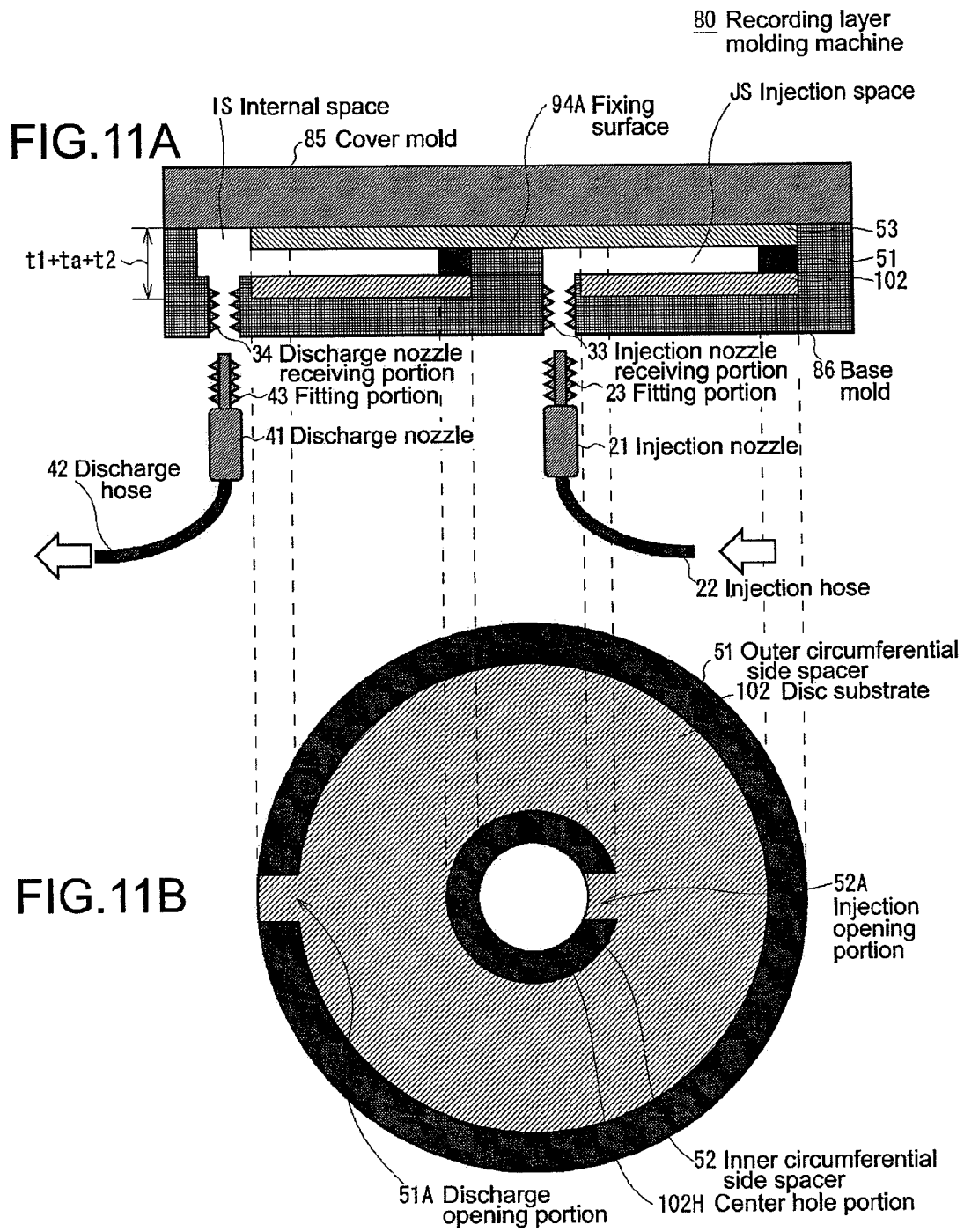
FIGS. 11A and 11B are simplified diagrams showing a structure (1) of a recording layer molding machine according to a third embodiment.
Figure 12:
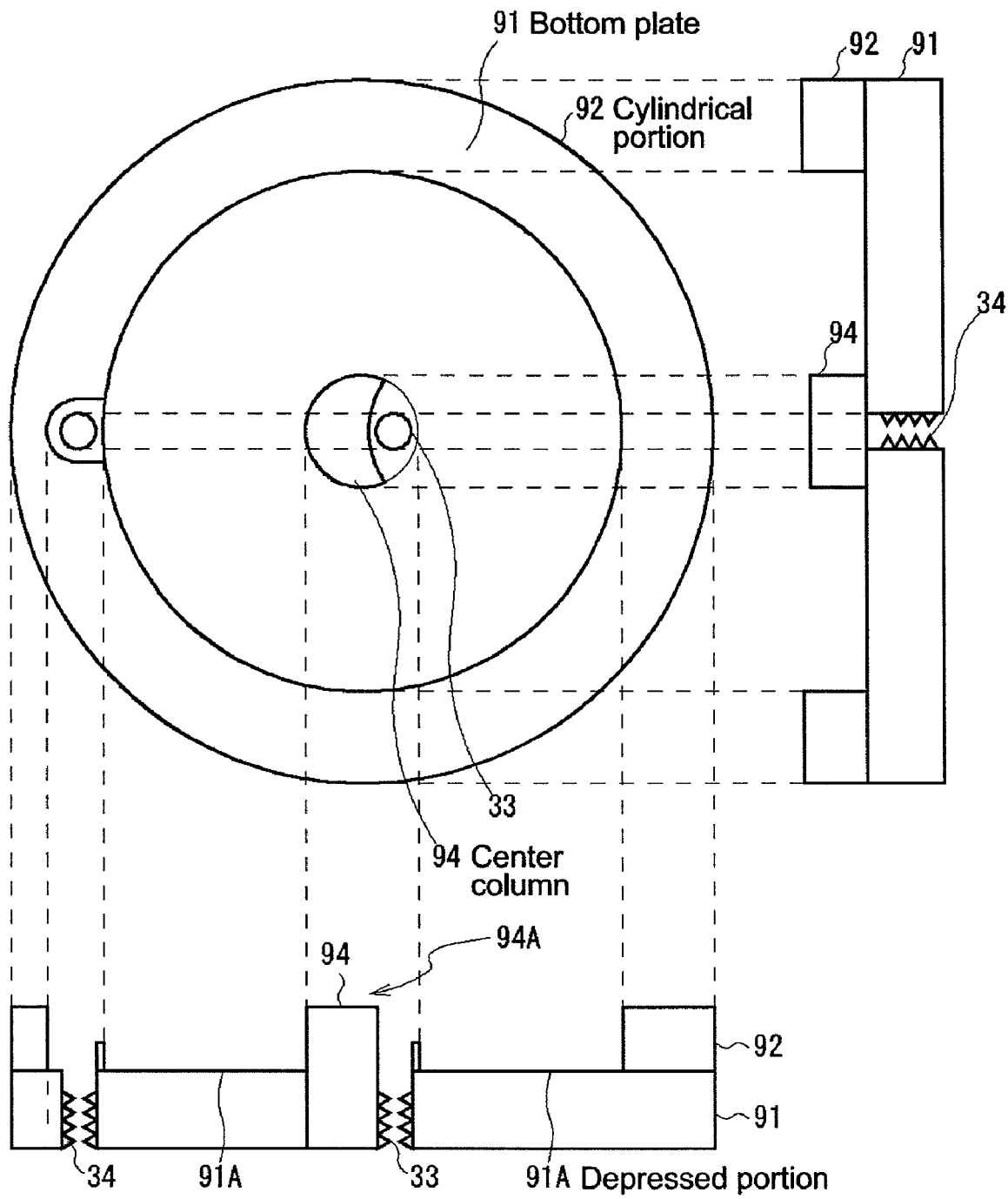
FIG. 12 is a simplified diagram showing a structure of a base mold according to the third embodiment.

In a third embodiment shown in FIGS. 11 and 12, portions corresponding to those in the second embodiment shown in FIGS. 8 to 10 are denoted by the same reference symbols, and descriptions thereof are omitted. The third embodiment is different from the second embodiment in that the injection nozzle receiving portion 33 is provided to a base mold 86 that corresponds to the base mold 56.

3-1. Structure of Recording Layer Molding Machine

As shown in FIG. 11, the structure of the casting cell SL is the same as that of the second embodiment, and accordingly descriptions thereof are omitted. A recording layer molding machine 80 corresponding to the recording layer molding machine 50 includes the injection nozzle receiving portion 33 and the discharge nozzle receiving portion 34 formed in the base mold 86.

As shown in FIG. 12, the base mold 86 has a structure in which a cylindrical portion 92 and a center column 94 protrude from a bottom plate 91. The height of the cylindrical portion 92 is formed so as to be the same as a thickness of the casting cell t1+ta+t2.

The center column 94 is formed to have a diameter that is substantially the same as that of the center hole portion 102H of the disc substrate 102 and fixes the casting cell SL in a horizontal direction by the center hole portion 102H of the disc substrate 102 being fitted thereto. Further, the height of the center column 94 is set to the height adding the thickness t2 of the disc substrate 102 and the thickness t1 of the recording layer 101 so that a fixing surface 94A of the center column 94 abuts on the flat plate 53 and fixes the casting cell SL in a perpendicular direction.

That is, the base mold 86 has all functions of fixing the casting cell SL, securing the internal space IS having the same height as the casting cell SL, and providing through-holes for injecting and discharging a liquid material. As a result, it is possible to structure a cover mold 85 as a simple circular plate.

For example, in a case where a UV curable resin is used as a liquid material and ultraviolet rays are needed to be irradiated without taking out the casting cell SL from the recording layer molding machine 80, a quartz glass substrate can be used as the cover mold 85, for example, with the result that the structure as the recording layer molding machine 80 can be simplified. Further, a circular plate does not always need to be used as the cover mold 85, a rectangular or square plate can be used, for example.

As described above, all the functions of fixing the casting cell SL, securing the internal space having the same height as the casting cell SL, and providing through-holes for injecting and discharging a liquid material are imparted to the base mold 86 in the recording layer molding machine 80. Accordingly, the recording layer molding machine 80 is structured to make the structure of the cover mold 85 simple.

3-2. Example

3-2-1. Example 8

In this example, a microwave-curing resin cured by irradiating a microwave was used as the liquid material. It should be noted that the viscosity of the liquid material was the same as that in Example 1. The cover mold 85 made of PET and the base mold 86 made of aluminum were used.

Similar to Example 5, the liquid material was filled into the casting cell SL except that the recording layer molding machine 80 was used. The casting cell SL was taken out from the recording layer molding machine 80 and a microwave was irradiated thereto for 3 minutes so that the liquid material was cured. Then, the flat plate 53 and the spacer group were removed from the casting cell SL.

In this example as well, air did not penetrate to the recording layer 101 and an excellent recording layer 101 was formed.

3-2-2. Example 9

Similar to Example 5, the liquid material was filled into the casting cell SL. The casting cell SL was taken out from the recording layer molding machine 80 and heated in an oven at 100° C. for 20 minutes so that the liquid material was cured. Then, the flat plate 53 and the spacer group were removed from the casting cell SL.

In this example as well, air did not penetrate to the recording layer 101 and an excellent recording layer 101 was formed.

3-2-3. Summary

From the above results, it was found that an excellent recording layer 101 could be molded even when the base mold 86 was imparted with all the functions of fixing the casting cell SL, securing the internal space IS having the same height as the casting cell SL, and providing through-holes for injecting and discharging a liquid material.

Further, even when the liquid material injected from the inner circumferential side of the lower direction (base mold 86) was discharged from the outer circumferential side of the lower direction, it was found that an excellent recording layer 101 could be formed. In other words, it was found that a difference due to the directions of injection and discharge (upper and lower directions) was hardly caused and the direction could be arbitrary selected.

3-3. Operation and Effect

In the structure described above, the base mold 86 of the recording layer molding machine 80 includes the center column 94 for fixing the casting cell SL, the cylindrical portion 92 for securing the internal space IS having the same height as the casting cell SL, and the injection nozzle receiving portion 33 and the discharge nozzle receiving portion 34 that are through-holes for injecting and discharging the liquid material.

Accordingly, in the recording layer molding machine 80, the cover mold 85 can be formed as a mere circular plate and the structure of the cover mold 85 can be made simple.

According to the structure described above, all the functions of fixing the casting cell SL, securing the internal space IS having the same height as the casting cell SL, and providing through-holes for injecting and discharging a liquid material were imparted to the base mold 86. In this case as well, the same effect as in the first embodiment can be produced.

4. Fourth Embodiment

Figure 13:
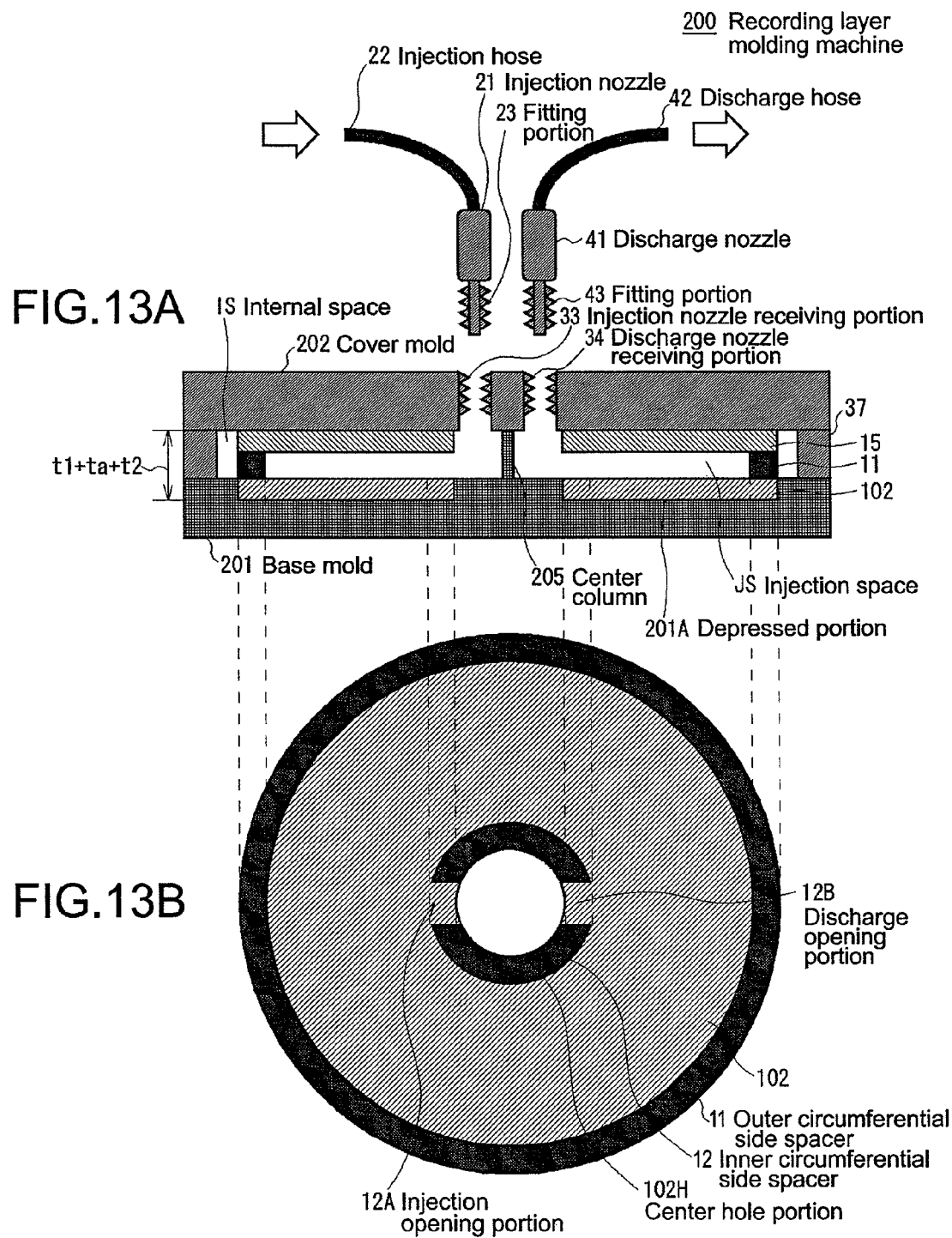
FIGS. 13A and 13B are simplified diagrams showing a structure (1) of a recording layer molding machine according to a fourth embodiment.
Figure 14:
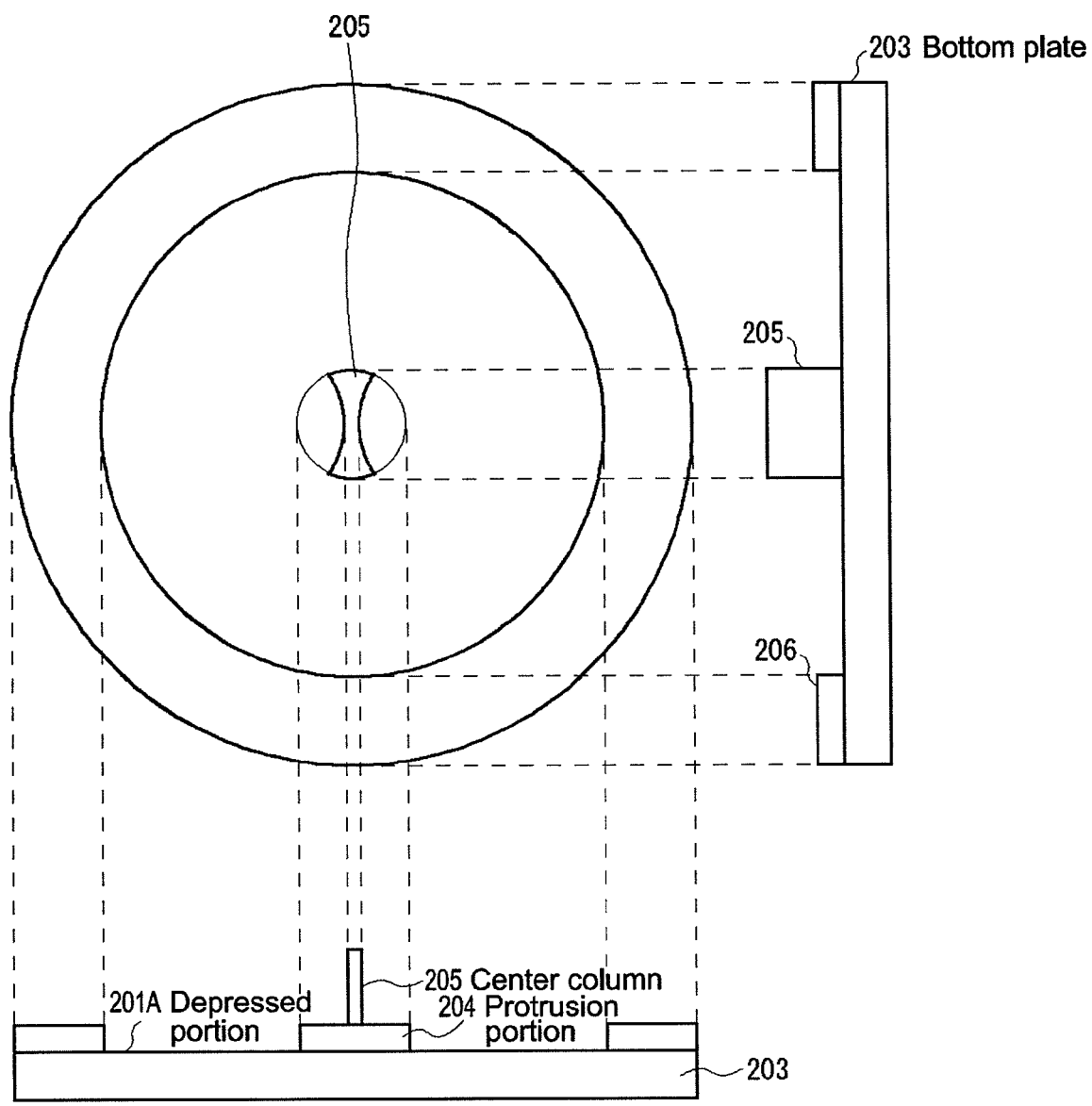
FIG. 14 is a simplified diagram showing a structure of a base mold according to the fourth embodiment.

In a fourth embodiment shown in FIGS. 13 and 14, portions corresponding to those in the first embodiment shown in FIGS. 1 to 7 are denoted by the same reference symbols, and descriptions thereof are omitted. The fourth embodiment is different from the first embodiment in that a base mold 201 includes a center column 205 corresponding to the center column 38.

4-1. Structure of Recording Layer Molding Machine

As shown in FIG. 13A, in a recording layer molding machine 200 corresponding to the recording layer molding machine 3, the center column 205 is provided to not a cover mold 202 but the base mold 201. It should be noted that as shown in FIG. 13B, the structure of the casting cell SL is the same as that of the first embodiment, and descriptions thereof are omitted.

As shown in FIG. 14, the base mold 201 includes a bottom plate 203, a columnar protrusion portion 204 that protrudes from the bottom plate 203, and the center column 205. A cylindrical portion 206 has an inner diameter that is substantially the same as an outer diameter of the disc substrate 102 and has the function of fixing the casting cell SL.

The protrusion portion 204 has a diameter that is substantially the same as that of the center hole portion 102H of the disc substrate 102, and has a function of fixing the casting cell SL together with the cylindrical portion 206. The center column 205 further protrudes from the protrusion portion 204.

The center column 205 is formed into a long and thin shape so as to avoid the injection nozzle receiving portion 33 and the discharge nozzle receiving portion 34 that are provided to the cover mold 202. The center column 205 holds a distance from the cover mold 202 and is structured to keep the height of the internal space IS uniform in the plane direction. Further, the center column 205 has a role of a bank that holds back the liquid material injected into the casting cell SL.

Since the center column 205 is provided to the base mold 201 in the recording layer molding machine 200, the liquid material can be held by the center column 205 even when the cover mold 202 is removed.

Thus, in the recording layer molding machine 200, the cover mold 202 is removed after the liquid material is filled into the casting cell SL and energy such as ultraviolet rays can be irradiated from the exposed flat plate 15 side.

Accordingly, in the recording layer molding machine 200, an excellent recording layer 101 can be formed even when a liquid material having low viscosity is used. Further, in the recording layer molding machine 200, an arbitrary material can be used as the base mold 201 and the cover mold 202.

As described above, the center column taking a role of a bank that holds back the liquid material is provided to the base mold 201 in the recording layer molding machine 200. Accordingly, the recording layer molding machine 200 is structured so that energy can be directly irradiated to the casting cell SL with the casting cell SL being fitted into the base mold 201.

4-2. Procedure of Optical Disc Recording Layer Forming Processing

Figure 15:
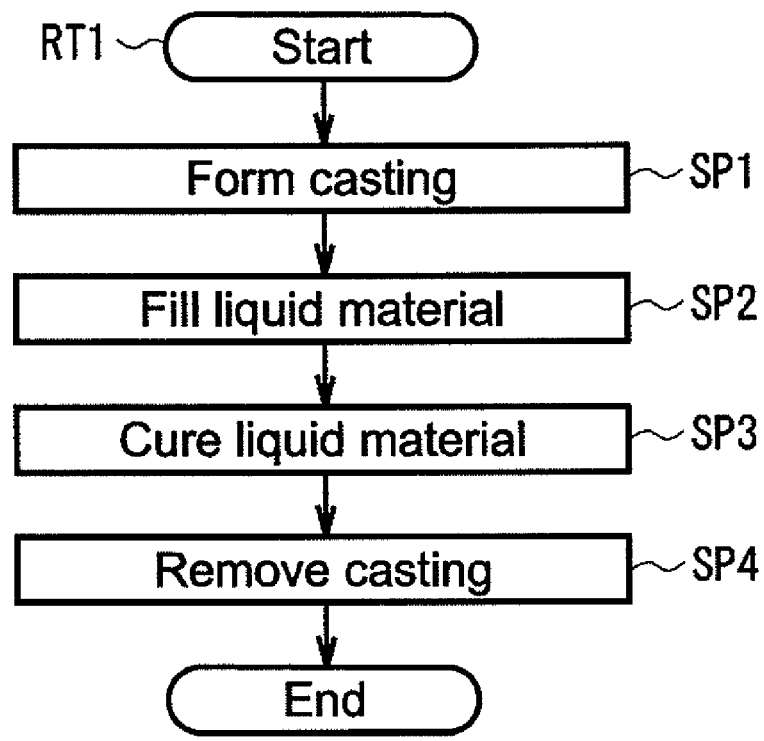
FIG. 15 is a flowchart for explaining a procedure of recording layer forming processing.

Next, procedure of optical disc recording layer forming processing RT1 will be described with reference to a flowchart of FIG. 15.

In Step SP1, the injection space JS is first formed. Specifically, the casting cell SL including the injection space JS is formed and the casting cell SL is set in the recording layer molding machine 200. Accordingly, the recording layer molding machine 200 forms the injection space JS via the casting cell SL.

In Step SP2, a liquid material is injected from the injection nozzle receiving portion 33 through the injection opening portion 12A provided to the inner edge portion of the casting cell SL. Further, air and the liquid material are discharged from the discharge nozzle receiving portion 34 through the discharge opening portion 12B that is opposite to the injection opening portion 12A in the casting cell SL, thus filling the liquid material.

In Step SP3, the liquid material is cured by applying heat or energy such as energy rays.

In Step SP4, the flat plate 15 and the spacer group are removed from the casting cell SL so that the recording layer 101 is taken out from the injection space JS. Accordingly, the recording layer 101 of the optical disc 100 is formed and the procedure of optical disc recording layer forming processing is ended.

4-3. Operation and Effect

In the structure described above, the recording layer molding machine 200 includes the center column 205 that is provided to protrude from the bottom plate 203 and secures the internal space IS having the same height as that of the casting cell SL by the base mold 201 when the cover mold 202 is placed on the base mold 201. The center column 205 passes through the center hole portion SLh in the casting cell SL, and thus it is prevented that the liquid material leaks from the injection opening portion 12A and the discharge opening portion 12B that serve as opening portions of the casting cell SL connected to the injection nozzle receiving portion 33 and the discharge nozzle receiving portion 34.

Accordingly, the recording layer molding machine 200 can directly irradiate energy to the casting cell SL with the cover mold 202 being removed and the casting cell SL being fitted into the base mold 201. Therefore, since the recording layer molding machine 200 does not cause energy to be absorbed by the cover mold 202 when the liquid material is cured, an energy efficiency can be increased.

Further, in the optical disc manufacturing method according to the embodiment of the present invention, the casting cell SL serving as a casting cell including the injection space JS having substantially the same thickness as the thickness t1 of the recording layer 101 is formed on the disc substrate 102 serving as an adjacent layer that is adjacent to the recording layer 101 on which recording marks are formed in accordance with irradiation of an information light beam as light.

In the optical disc manufacturing method, the liquid material in a liquid state is filled into the casting cell SL and energy is applied to the liquid material so that the recording layer 101 formed by curing the liquid material is formed, and the flat plate 15 and the spacer group are removed from the casting cell SL.

Accordingly, in the optical disc manufacturing method, a thick recording layer 101 can be directly formed on the disc substrate 102.

According to the structure described above, the casting cell SL is formed on the disc substrate 102 and the liquid material is filled into the casting cell SL to be cured in the optical disc manufacturing method. Accordingly, a thick recording layer 101 can be directly formed on the disc substrate 102 irrespective of the viscosity of the liquid material in the embodiment of the present invention.

5. Other Embodiment

Figure 16:
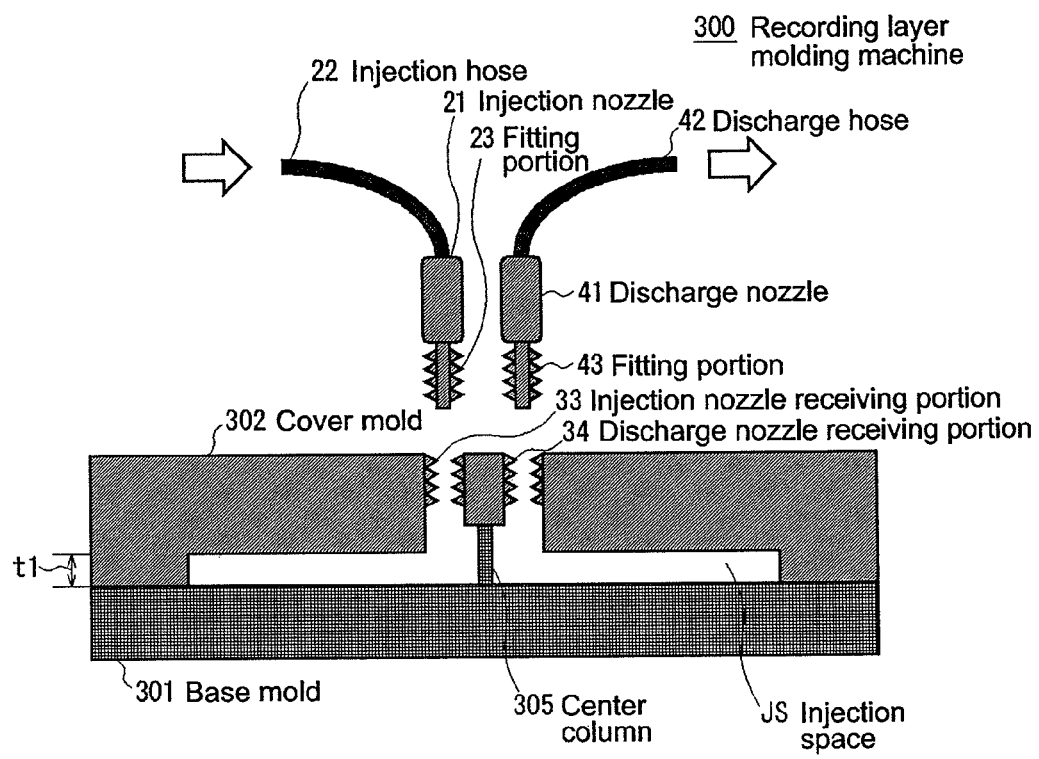
FIG. 16 is a simplified diagram showing a structure of a recording layer molding machine according to another embodiment.

It should be noted that in the first to fourth embodiments described above, the case where the casting cell SL is held within the internal space IS formed by the base mold and the cover mold has been described, but the present invention is not limited thereto. As shown in FIG. 16, for example, an internal space that is formed by a base mold 301 and a cover mold 302 may be set as the injection space JS without using the casting cell SL. In this case, by curing the liquid resin in a recording layer molding machine 300 and taking out the cured liquid resin from the recording layer molding machine 300 to cut an unnecessary portion, it is possible to form the recording layer 101 as in the above embodiments.

It should be noted that the base mold 301 of the recording layer molding machine 300 has the same structure as the base mold 201 of the fourth embodiment except that the bottom plate 203 does not include a depressed portion 201A and a center column 305 protrudes from the flat plate. Further, the cover mold 302 has the same structure as the cover mold 202 except that a cylindrical portion 37 has the height equal to the thickness t1 of the recording layer and has an inner diameter that is formed to be the same as an outer diameter of the recording layer 101.

Further, in the first to fourth embodiments described above, the case where the optical disc 100 includes the reference layer 103 has been described, but the present invention is not limited thereto. The reference layer 103 may not be necessarily provided. In this case, a servo mark or the like is formed in the recording layer 101, for example, and when an optical information recording/reproducing apparatus detects the servo mark, a target position of a light beam can be determined. In addition, the structure of the optical disc 100 is not limited to the structure shown in FIG. 2. For example, an optical disc may be structured with only the recording layer 101 as long as a physical strength can be ensured as a single recording layer 101. A diameter of the optical disc 100 or recording layer 101 has no limitation.

Moreover, in the first to fourth embodiments described above, the case where the recording layer 101 is directly formed on the disc substrate 102 has been described, but the present invention is not limited thereto. For example, a circular plate-shaped recording layer 101 like a doughnut shape may be formed and attached to an adjacent layer that is adjacent thereto, using an adhesive sheet or adhesive.

Moreover, in the first to fourth embodiments described above, the case where the recording layer 101 is formed using the recording layer molding machine 3 has been described, but the present invention is not limited thereto. For example, the disc substrate 102 or the cover layer 104 may be formed.

Moreover, in the first to fourth embodiments described above, the case where the liquid material is injected from the injection nozzle receiving portion 33 formed at the inner edge portion and air is discharged from the discharge nozzle receiving portion 34 that is provided opposite to the injection nozzle receiving portion 33 has been described, but the present invention is not limited thereto. The present invention is not necessarily restricted by the positions of the injection hole and discharge hole. In short, it is only necessary to form the injection space JS on the disc substrate 102 on which the adjacent reference layer 103 is formed and then form the recording layer 101 by filling and curing the liquid material.

Moreover, in the first to fourth embodiments described above, the case where the liquid material is discharged via the discharge nozzle receiving portion 34 has been described, but the present invention is not limited thereto. It is only necessary to discharge at least air.

Moreover, in the embodiments described above, the case where the injection nozzle receiving portion 33 and the fitting portion 23 have a screw system has been described, but the present invention is not limited thereto. In short, leakage of contents only needs to be prevented and a structure thereof has no limitation. The same holds true for the discharge nozzle receiving portion 34 and the fitting portion 43.

Moreover, in the first to fourth embodiments described above, the case where the liquid material is pressure-injected has been described, but the present invention is not limited thereto. For example, a reduced pressure may be used in combination or no pressure may be applied.

Moreover, in the first embodiment described above, the case where the casting cell SL is formed using the spacer group and the flat plate 15 has been described, but the present invention is not limited thereto. For example, the casting cell SL may be directly formed on the disc substrate 102 using a mold.

Moreover, in the first to fourth embodiments described above, the case where the liquid material having low viscosity is employed has been described, but the present invention is not limited thereto. The viscosity of the liquid material has no limitation. For example, in a case where a liquid material having high viscosity is used in the present invention, an excellent recording layer 101 can be formed by making a pressure applied to the liquid material large.

Moreover, in the first to fourth embodiments described above, the case where the doughnut-shaped circular plate with a center hole is used as the adjacent reference layer 103 has been described, but the present invention is not limited thereto. For example, a circular plate without a center hole may be used and a center hole may be punched out after the recording layer 101 is formed.

Moreover, in the embodiments described above, the case where the recording marks RM are three-dimensionally formed has been described, but the present invention is not limited thereto. For example, the recording marks RM may be two-dimensionally formed by providing only one virtual mark recording layer.

Moreover, in the embodiments described above, the case where the recording layer molding machine 3 as an optical disc manufacturing apparatus is structured has been described, but the present invention is not limited thereto. An optical disc manufacturing apparatus having other various structures may be structured.

The present invention can also be used in an optical information recording/reproducing apparatus or the like that records a large size of information such as video contents and audio contents on a recording medium such as an optical information recording medium or reproduces it.

The present application contains subject matter related to that disclosed in Japanese Priority Patent Application JP 2009-055404 filed in the Japan Patent Office on Mar. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc manufacturing method, the method comprising:
    an injection step of injecting a liquid material into a circular plate-shaped injection space having a center hole portion at a center from an injection hole connected to an inner edge portion in the injection space;
    a discharge step of discharging air and the liquid material from a discharge hole formed on a straight line passing through the injection hole and the center of the center hole portion in a plane direction of the circular plate and at a position opposite to the injection hole;
    a curing step of curing the liquid material injected into the injection space;
    a takeout step of taking out the cured liquid material from the injection space;
    wherein the injection space comprises a casting cell;
    wherein, in the injecting and the discharging, the casting cell is held in an internal space that is formed by a base mold on which the casting cell is placed and a cover mold that covers an upper portion of the base mold and has the same thickness as that of the casting cell; and
    wherein the base mold includes a center column that is provided to protrude from a bottom plate, secures the internal space having the same thickness as that of the casting cell when the cover mold is placed on the base mold, and prevents the liquid material from leaking from opening portions of the casting cell connected to the injection hole and the discharge hole by passing through the center hole portion in the casting cell.

2. The optical disc manufacturing method according to claim 1,
    wherein the liquid material is pressure-injected in the injecting.

3. The optical disc manufacturing method according to claim 1,
    wherein the air and the liquid material are discharged so that a pressure of the injection space is reduced to be equal to or lower than an atmospheric pressure in the discharging.

4. The optical disc manufacturing method according to claim 2,
    wherein the injection space has a thickness equal to or larger than 0.05 mm and equal to or smaller than 1.0 mm in a direction perpendicular to the plane direction of the circular plate.

5. The optical disc manufacturing method according to claim 3,
    wherein the casting cell is formed by installing a spacer between two circular plates so that the spacer comes into close contact with the two circular plates.

6. The optical disc manufacturing method according to claim 5,
    wherein one of the two circular plates is an adjacent layer that is adjacent to the cured liquid material.

7. The optical disc manufacturing method according to claim 6,
    wherein the casting cell is taken out of the internal space in the curing step.

8. The optical disc manufacturing method according to claim 6,
wherein the casting cell is held within the internal space in the curing step.

9. The optical disc manufacturing method according to claim 6,
wherein the casting cell is held within the base mold in a state where the cover mold is detached in the curing step.

10. The optical disc manufacturing method according to claim 1,
wherein the cured liquid material is a recording layer in which a plurality of three-dimensional recording marks made by modulation of a refractive index are formed and superimposed on each other in a thickness direction.

11. The optical disc manufacturing method according to claim 6,
wherein the liquid material has a viscosity smaller than 3,500 mPa/s.

12. The optical disc manufacturing method according to claim 11,
wherein the viscosity of the liquid material is larger than 5 mPa/s.

13. The optical disc manufacturing method according to claim 1,
wherein the liquid material contains any one or more of an energy-ray curable resin, a thermosetting resin, or a silicate compound before curing.

14. The optical disc manufacturing method according to claim 13,
wherein the energy ray for curing the resin is any one or more of an electron ray, an ultraviolet ray, visible light, an infrared ray, or a microwave.

15. The optical disc manufacturing method according to claim 6,
wherein at least one of the two circular plates is a doughnut-shaped circular plate having a center hole.

16. The optical disc manufacturing method according to claim 6,
wherein the spacer is an adhesive film having adhesiveness on one of one surface or both surfaces thereof.

17. The optical disc manufacturing method according to claim 12,
wherein the viscosity of the liquid material is larger than 40 mPa/s.

18. The optical disc manufacturing method according to claim 5, wherein the injection space is constituted of the casting cell.

* * * * *